(12) United States Patent
Ohashi et al.

(10) Patent No.: US 11,562,567 B2
(45) Date of Patent: Jan. 24, 2023

(54) OBSERVED-OBJECT RECOGNITION SYSTEM AND METHOD

(71) Applicant: Hitachi, Ltd., Tokyo (JP)

(72) Inventors: Hiroki Ohashi, Tokyo (JP); Katsuyuki Nakamura, Tokyo (JP); Hiroyuki Yoshimoto, Tokyo (JP); Naoko Ushio, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 161 days.

(21) Appl. No.: 17/186,613

(22) Filed: Feb. 26, 2021

(65) Prior Publication Data
US 2021/0295053 A1    Sep. 23, 2021

(30) Foreign Application Priority Data
Mar. 18, 2020    (JP) .............................. JP2020-048062

(51) Int. Cl.
  *G06V 10/22*    (2022.01)
  *G06V 20/40*    (2022.01)
  *G06V 40/20*    (2022.01)

(52) U.S. Cl.
  CPC .............. *G06V 20/41* (2022.01); *G06V 10/22* (2022.01); *G06V 40/20* (2022.01)

(58) Field of Classification Search
  CPC ...... G06V 20/41; G06V 20/20; G06V 20/647; G06V 10/22; G06V 10/25; G06V 40/20; G06V 40/28
  See application file for complete search history.

(56) References Cited

U.S. PATENT DOCUMENTS

| 2015/0063640 A1* | 3/2015 | Anabuki ................ G06V 20/52 |
|  |  | 382/103 |
| 2018/0075286 A1* | 3/2018 | Onomura ............... G06V 40/19 |
| 2020/0134313 A1* | 4/2020 | Endoh ..................... G06N 3/084 |
| 2020/0167947 A1* | 5/2020 | Okazaki ................. G06V 40/10 |
| 2021/0390673 A1* | 12/2021 | Ban ......................... G06T 7/194 |

FOREIGN PATENT DOCUMENTS

| JP | 2004282535 A | * | 10/2004 |  |
| JP | 3885999 B2 | * | 2/2007 | ............. G06T 7/215 |
| JP | 2019-128804 A |  | 8/2019 |  |
| JP | 2020068008 A | * | 4/2020 | ......... G06K 9/00711 |
| WO | WO-2020080139 A1 | * | 4/2020 | ......... G06K 9/00711 |

OTHER PUBLICATIONS

Translated version of JP3885999 (Year: 2007).*
Translated version of JP2020068008 (Year: 2020).*
Translated version of WO2020080139 (Year: 2020).*
Translated version of JP2004282535 (Year: 2004).*

* cited by examiner

*Primary Examiner* — Carol Wang
(74) *Attorney, Agent, or Firm* — Volpe Koenig

(57) ABSTRACT

To accurately recognize observed objects.
An observed-object recognition system includes an observation region estimation portion, an existence region estimation portion, and an object recognition portion. The observation region estimation portion estimates an observation region that is relatively highly likely to be an observation point in at least one first-person image in a first-person video (a video based on the first-person perspective). Based on the observation region, the existence region estimation portion estimates an existence region that belongs to the first-person image and causes an observed object to exist. The object recognition portion recognizes an object in the estimated existence region of the first-person image.

14 Claims, 20 Drawing Sheets

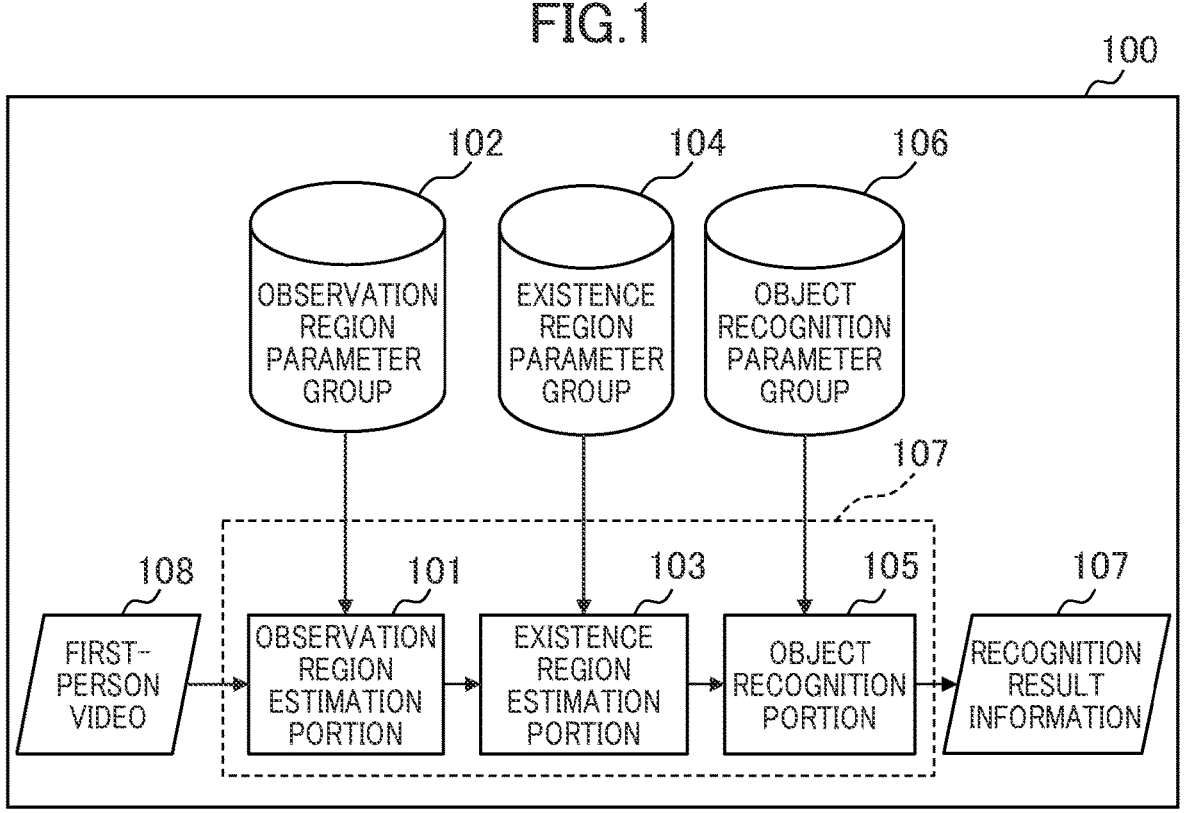
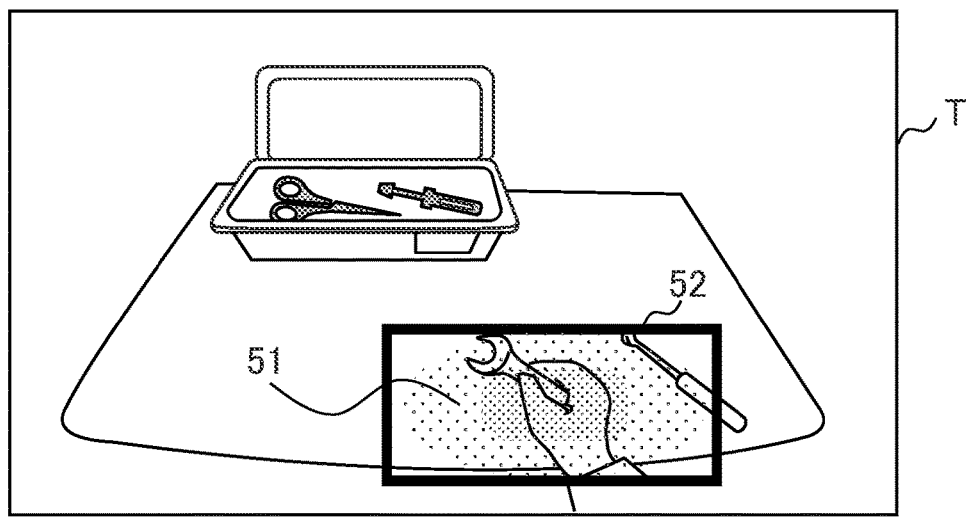

FIG.19

TASK MODEL
1802

|   | A | B | C |
|---|---|---|---|
| A | 0.1 | 0.8 | 0.1 |
| B | 0.02 | 0.08 | 0.9 |
| C | 0.86 | 0.1 | 0.04 |

WORKING DB
2002

| PRODUCT NAME | PROCESS ID | INSPECTION OBJECT | STANDARD INSPECTION TIME |
|---|---|---|---|
| A | 1 | SCREW | 5.0 |
| A | 2 | SWITCH | 1.5 |
| A | 3 | WATTMETER | 2.1 |
| B | 1 | MANOMETER | 3.3 |
| ... | ... | ... | ... |

FIG.22

```
┌─────────────────────────────────────┐
│          INSPECTION RECORD          │
├─────────────────────────────────────┤
│                                     │
│  OPERATOR ID : [              ]     │
│                                     │
│  PRODUCT ID :  [              ]     │
│                                     │
│  ( OPERATION START )  ( OPERATION END ) │
│                                     │
└─────────────────────────────────────┘
```

FIG.23

INSPECTION RECORDING DB
<u>2003</u>

| PRODUCT ID | INSPECTION OBJECT | STANDARD INSPECTION TIME | OPERATION DATE | OPERATOR ID | VISUAL INSPECTION TIME |
|---|---|---|---|---|---|
| A-103 | SCREW | 5.0 | 11/24 | 6012 | 14:51:26.015-14:51:31.872 |
| A-103 | SWITCH | 1.5 | 11/24 | 6012 | 14:51:36.387-14:51:38.721 |
| A-103 | WATTMETER | 2.1 | 11/24 | 6012 | 14:51:40.009-14:51:40.868 |
| B-408 | MANOMETER | 3.3 | 11/25 | 6012 | 11:27:06.516-11:27:10.273 |
| ... | ... | ... | ... | ... | ... |

INSPECTION RECORDING DB
2003

| PROCESS ID | INSPECTION OBJECT | STANDARD INSPECTION TIME | OPERATION DATE | OPERATOR ID | VISUAL INSPECTION TIME | VIDEO |
|---|---|---|---|---|---|---|
| A-103 | SCREW | 5.0 | 11/24 | 6012 | 14:51:26.015–14:51:31.872 | xxx.wmv |
| A-103 | SWITCH | 1.5 | 11/24 | 6012 | 14:51:36.387–14:51:38.721 | yyy.wmv |
| A-103 | WATTMETER | 2.1 | 11/24 | 6012 | 14:51:40.009–14:51:40.868 | zzz.wmv |
| B-408 | MANOMETER | 3.3 | 11/25 | 6012 | 11:27:06.516–11:27:10.273 | ppp.wmv |
| ... | ... | ... | ... | ... | ... | ... |

OBSERVED-OBJECT RECOGNITION SYSTEM AND METHOD

BACKGROUND

The present invention generally relates to a technology to recognize an object contained in an image.

Japanese Unexamined Patent Application Publication No. 2019-128804 discloses the technology that learns object specification and observation estimation according to multitasking based on a first-person image (an image viewed from the first person) and estimates observation information about a user.

SUMMARY

There is a need to recognize an object observed by an operator by processing a first-person image acquired from a wearable camera worn by the operator on a manufacturing floor.

A possible method to recognize an object observed by the operator (an object as an observation target) is to estimate an observation point position in a first-person image by using the technology disclosed in Japanese Unexamined Patent Application Publication No. 2019-128804 and recognize an object within a specified range based on the estimated observation point position.

However, the shape and size of an observed object depend on the object. The relative orientation of the observed object with respect to the first-person image and an area occupied by the observed object in the first-person image depend on the first-person image (or an image-capturing operator). Therefore, it is difficult to accurately recognize the observed object in the first-person image.

The above-described issue concerns not only first-person images captured on the manufacturing floor but also first-person images captured in places other than the manufacturing floor.

An observed-object recognition system includes an observation region estimation portion, an existence region estimation portion, and an object recognition portion. The observation region estimation portion estimates an observation region that is relatively highly likely to be an observation point in a first-person image in a first-person video (a video based on the first-person perspective). Based on the observation region, the existence region estimation portion estimates an existence region that belongs to the first-person image and causes an observed object to exist. The object recognition portion recognizes an object in the estimated existence region of the first-person image.

The present invention can accurately recognize an observed object.

BRIEF DESCRIPTION OF THE DRAWINGS

FIG. 1 illustrates a function configuration of the observed-object recognition system according to a first embodiment;

FIG. 2 illustrates one first-person image in the first-person video;

FIG. 19 illustrates a task model;

FIG. 22 illustrates a GUI for input to start an operation;

FIG. 23 illustrates an inspection recording DB;

DETAILED DESCRIPTION

Figure 3:
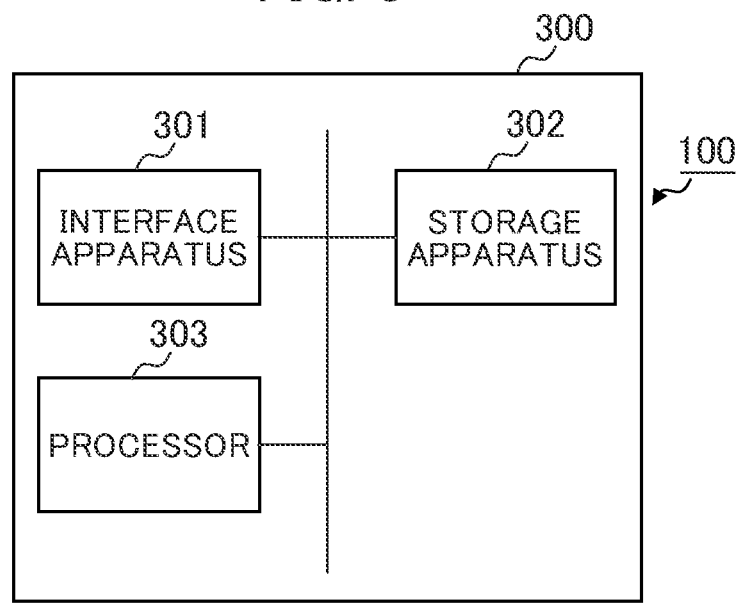
FIG. 3 illustrates a hardware configuration of the observed-object recognition system.

In the following description, an "interface apparatus" may represent one or more interface devices. One or more of the interface devices may represent at least one of the following.

One or more I/O (Input/Output) interface devices. An I/O (Input/Output) interface device is associated with at least one of an I/O device and a remote display computer. The I/O interface device associated with the display computer may be provided as a communication interface device. At least one I/O device may be provided as an input device such as a user interface device including a keyboard and a pointing device or an output device such as a display device.

One or more communication interface devices. One or more communication interface devices may be provided as the same type of one or more communication interface devices (such as one or more NICs (Network Interface Cards)) or different types of two or more communication interface devices (such as NIC and HBA (Host Bus Adapter).

In the following description, the "memory" is provided as one or more memory devices, exemplifying one or more storage devices, and may typically be provided as the main storage device. At least one memory device in the memory may be provided as a volatile memory device or a non-volatile memory device.

In the following description, a "storage apparatus" may be provided as one or more permanent storage devices exemplifying one or more storage devices. The permanent storage device may be typically provided as a non-volatile storage device (such as an auxiliary storage device) including HDD (Hard Disk Drive), SSD (Solid State Drive), NVMe (Non-Volatile Memory Express) drive, or SCM (Storage Class Memory), for example.

In the following description, the "storage apparatus" may be provided as the memory and at least memory of the permanent storage apparatus.

In the following description, a "processor" may be provided as one or more processor devices. At least one processor device may be typically provided as a microprocessor device such as a CPU (Central Processing Unit) but may be provided as another type of processor device such as a GPU (Graphics Processing Unit). At least one processor device may be configured as a single-core or a multi-core. At least one processor device may be configured as a processor core. At least one processor device may be provided as a processor device in a broad sense, namely, a circuit as an aggregate of gate arrays (such as FPGA (Field-Programmable Gate Array), CPLD (Complex Programmable Logic Device) or ASIC (Application Specific Integrated Circuit)) based on a hardware description language to process all or part of the processing.

In the following explanation, the expression "xxxDB" ("DB" is an abbreviation for a database) may explain the information that provides outputs corresponding to inputs. The information can be any structured data (such as structured or unstructured data), a neural network to generate outputs corresponding to inputs, or learning models such as genetic algorithms and random forests. Therefore, "xxxDB" can be described as "xxx information". In the following explanation, the configuration of each DB is provided as an example. One DB may be divided into two or more DBs. All or part of two or more DBs may be configured as one DB.

In the following explanation, the expression of "yyy portion" may represent a function. The function may be provided by allowing a processor to execute one or more computer programs, by one or more hardware circuits (such as FPGA or ASIC), or a combination thereof. At least one yyy portion may contain a model generated by machine learning. The model may include an autoregressive moving average model (such as ARIMA (Autoregressive Integrated Moving Average) model) or a neural network (such as CNN (Convolutional Neural Network) or RNN (Recurrent Neural Network)), for example. When the function is provided by allowing the processor to execute programs, a predetermined process is performed with appropriate use of the storage apparatus and/or the communication interface apparatus, for example. Therefore, the function may constitute at least part of the processor. The process described in terms of the function as the subject may be considered as a process performed by the processor or a device including the processor. Programs may be installed from a program source. The program source may be provided as a program distribution computer or a computer-readable recording medium (such as a nonvolatile recording medium), for example. The description of each function is an example. Multiple functions may be integrated into one function, or one function may be divided into multiple functions.

In the following embodiments, the first-person video is captured by a wearable camera worn by an operator on the manufacturing floor. The present invention can be applied to the first-person video captured by a user at a location other than the manufacturing floor. The "first-person video" is generated from a first-person perspective and is comprised of chronological first-person images (frames).

First Embodiment

FIG. 1 illustrates a function configuration of the observed-object recognition system according to the first embodiment. FIG. 2 illustrates one first-person image in the first-person video.

An observed-object recognition system 100 according to the first embodiment includes a gaze area estimation portion 101, an existence area estimation portion 103, and an object recognition portion 105. The observation region estimation portion 101 estimates the observation region 51, namely, a region causing a relatively high probability (an example of possibility) of being an observation point in at least one first-person image T in the first-person video 108. Based on the observation region 51, the existence region estimation portion 103 estimates an existence region 52 containing an observed object in first-person image T. The object recognition portion 105 recognizes an object 53 in the estimated existence region 52 of first-person image T. This observed-object recognition system 100 estimates the observation region 51 causing a relatively high probability of being the observation point rather than the observation point as a single point. The existence region 52 containing the observed object is estimated based on the observation region 51 (such as the shape of a region marked by a relatively high probability in the observation region). The shape and size of the observed object depend on the object. The relative orientation of the observed object with respect to the first-person image and the region occupied by the observed object in the first-person image depend on the first-person image (the operator capturing a picture). Such variations are resolved by the existence region 52 estimated after estimation of the observation region 51. Of first-person image T, only the existence region 52 as a narrowed region is assumed to be an applicable scope of processing for object recognition. An object 53 is recognized from the existence region 52. Therefore, the recognized object 53 is highly likely to be the observed object (object to be observed). Namely, the observed object can be recognized accurately.

The observed-object recognition system 100 includes an observed-object recognition portion 107. The observed-object recognition portion 107 includes the observation region estimation portion 101, the existence region estimation portion 103, and the object recognition portion 105.

As illustrated in FIG. 3, the observed-object recognition system 100 can be embodied as a computer system 300 composed of one or more physical computers. The computer system 300 includes an interface apparatus 301, a storage apparatus 302, and a processor 303 connected to them. The processor 303 executes one or more programs stored in the storage apparatus 302 to provide the observation region estimation portion 101, the existence region estimation portion 103, and the object recognition portion 105. The observed-object recognition system 100 may replace the computer system 300 with other types of systems including a system (such as a cloud computing service system) embodied based on multiple types of computational resources (such as a cloud platform) contained in one or more physical computers.

The description below explains the first embodiment in detail. In the following description, a "parameter group" signifies one or more parameters. The "parameter" represents at least a parameter value when a parameter item and a parameter value are implied.

As illustrated in FIG. 1, the observed-object recognition system 100 manages an observation region parameter group 102, an existence region parameter group 104, and an object recognition parameter group 106. These parameter groups 102, 104, and 106 are stored in the storage apparatus 302. For example, the observation region estimation portion 101, the existence region estimation portion 103, and the object recognition portion 105 each include a neural network as an example of a machine learning model. Each of the parameters groups 102, 104, and 106 includes parameters representing weights of links among nodes in the neural network, for example.

The observation region estimation portion 101 estimates an observation region in first-person image T by using the observation region parameter group 102. For example, the observation region estimation portion 101 calculates the probability (an example of possibility) of an observation point belonging to each of all or part of pixels (an example of multiple positions) in first-person image T. In other words, the observation region estimation portion 101 generates a probability map (an example of the probability distribution) that represents multiple probabilities (an example of possibilities) corresponding to all or part of pixels configuring first-person image T. The total value of the probabilities configuring the probability map is "1," for example. According to the present embodiment, a set of pixels with high probability represents the observation region. The "high probability" signifies an absolutely high probability or a relatively high probability. The absolutely high probability is greater than or equal to the first threshold, for example. The relatively high probability belongs to top N (N is a natural number) or top M % (M>0), for example. The observation region parameter group 102 may be provided by prior learning using a dedicated device for observation point estimation.

The observation region 51 may be represented on first-person image T. An example of representation of the observation region 51 includes a heat map illustrated in FIG. 2. A display mode is applied to pixels belonging to the heat map (pixels belonging to the observation region 51). The display mode for each pixel complies with the probability calculated for the pixel. The display mode may be used as any mode such as color, darkness, or a combination thereof. A multi-stage display mode corresponding to degrees of probability is used. According to the heat map example illustrated in FIG. 2, the higher probability corresponds to the darker color.

The existence region estimation portion 103 estimates the existence region 52 based on the observation region estimated by the observation region estimation portion 101 and the existence region parameter group 104. In other words, the observation region is the observation region information output from the observation region estimation portion 101 or is considered as the information representing the observation region (such as a probability map). The existence region parameter group 104 may be also provided by prior learning. For example, many sets of first-person images and annotations may be used as training data for this purpose. For example, each first-person image is provided with the annotation in the form of a bounding box for the region of the observed object in the first-person image. Machine learning using such training data may provide the existence region parameter group 104. According to the example of FIG. 2, the existence region 52 is shaped into a rectangular but is not limited thereto.

The existence region estimation portion 103 may estimate the existence region by using at least one of at least part of the first-person video 108 (such as first-person image T); and intermediate output from the observation region estimation portion 101 (such as information acquired in the middle of processing), in addition to the estimated observation region and existence region parameter group 104. Hereafter, the explanation like this paragraph will be omitted. Input to each yyy portion (an input used for the processing performed by the yyy portion) may be one or both of the following. Therefore, for example, an input to the yyy portion may be an input to the yyy portion at the previous stage or an intermediate output from the yyy portion at the previous stage.

At least part of the output from one or more yyy portions preceding the yyy portion.

At least part of the input to one or more yyy portions preceding the yyy portion.

The object recognition portion 105 recognizes an object from the estimated existence region and outputs recognition result information 109 (such as the object name of the recognized object), namely, the information representing the recognized object. For example, the object recognition portion 105 extracts the range of the existence region from first-person image T by using an output from the existence region estimation portion 103, the output being information representing the estimated existence region (such as coordinates in first-person image T), for example. The object recognition portion 105 then performs a process for object recognition on the extracted image part. The process may use the object recognition parameter group 106. For example, the object recognition parameter group 106 may be provided by machine learning using training data (such as an annotation containing an image and the object name of an object in the image).

The preparation (learning) of the parameter groups 102, 104, and 106 may be performed for each parameter group or may be performed all at the same time (end-to-end) as multitask learning. The observation region estimation portion 101, the existence region estimation portion 103, and the object recognition portion 105 may conform to at least one of the models such as CNN to process video on a frame basis (one image), 3D CNN to process multiple frames at a time, and RNN associated with chronological information.

Figure 4:
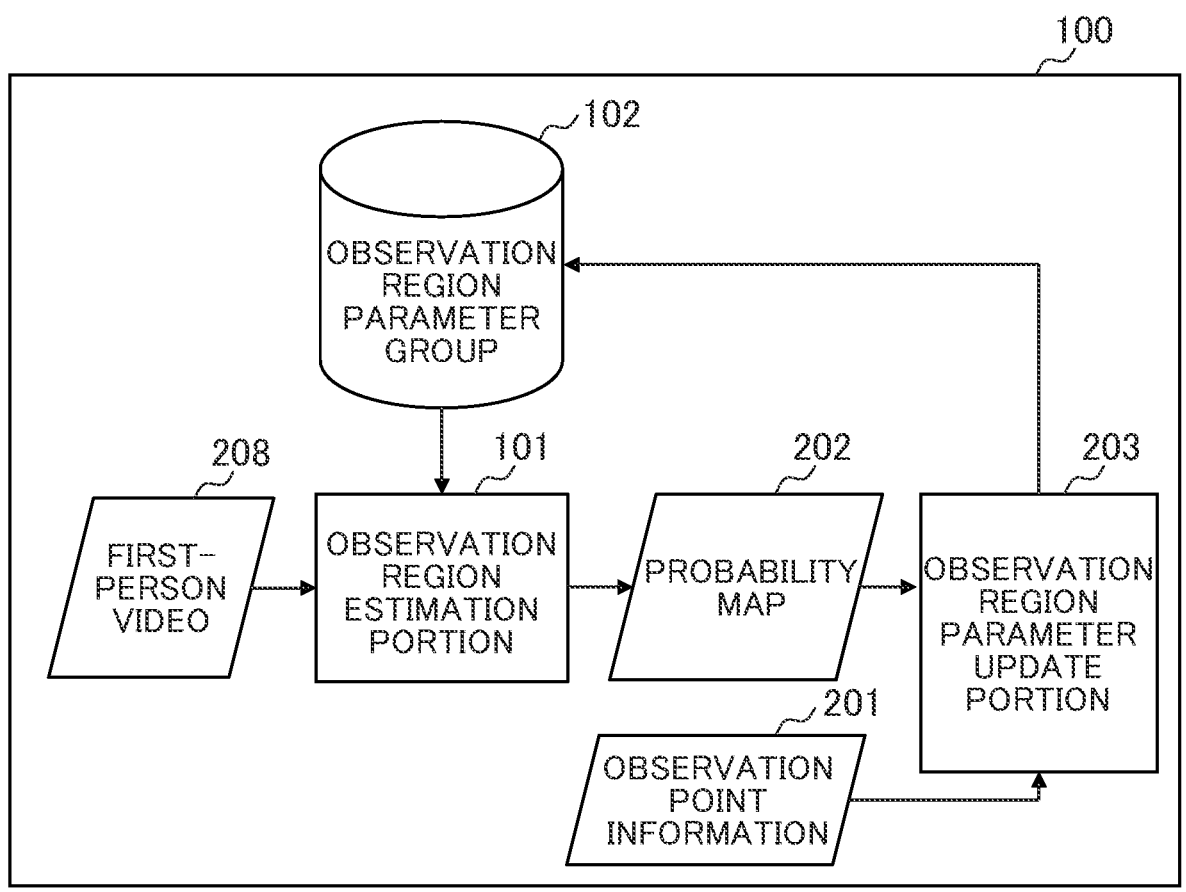
FIG. 4 illustrates a flow of learning an observation region parameter group according to the first embodiment.

FIG. 4 illustrates learning of the observation region parameter group 102.

Observation region training data, namely, training data used for learning of the observation region parameter group 102, is provided in advance. The observation region training data includes multiple first-person images configuring the first-person video 208 captured by an operator (such as a skilled operator) and observation point information 201 representing the estimated observation point positions corresponding to the first-person images. For example, the observation point information 201 is provided as coordinates representing the positions of the observation points in the first-person image. Each first-person image is provided with the observation point information 201 through the use of a dedicated device that can estimate the position of the point the operator is gazing at, for example.

The observed-object recognition system 100 includes an observation region parameter update portion 203 that updates the observation region parameter group 102.

The description below explains the learning flow of the observation region parameter group 102, for example. The observation region estimation portion 101 may conform to a machine learning model such as a neural network.

(S41) The observation region parameter group 102 is initialized to a random value, for example.

(S42) The observation region estimation portion 101 determines whether the first-person video 208 contains an unselected first-person image.

(S43) If the determination result of S42 is false, the learning terminates. The new first-person video 208 may be entered and S42 may be restarted based on the new first-person video 208.

(S44) If the determination result of S42 is true, the observation region estimation portion 101 selects one unselected first-person image.

(S45) The observation region estimation portion 101 uses the observation region parameter group 102 to calculate the probability of being an observation point for each pixel in the first-person image selected at S44. A set of probabilities corresponding to all pixels is provided as a probability map 202. The "pixel" in the first-person image exemplifies a position in the image. The "probability" of each pixel exemplifies the possibility of being an observation point. The possibility of being an observation point may be expressed in terms of a score in place of the probability.

(S46) The observation region estimation portion 101 determines an error between the probability map 202 (such as an observation point position estimated from the probability map 202) acquired at S45 and the observation point information 201 corresponding to the first-person image selected at S44.

(S47) If the error determined at S46 is smaller than a predetermined value, the learning terminates.

(S48) If the error determined at S46 is greater than or equal to the predetermined value, the observation region parameter update portion 203 uses an error backpropagation method, for example, to update the observation region parameter group 102 by using the probability map 202 acquired at S45 and the observation point information 201 corresponding to the first-person image selected at S44. The process then returns to S42.

The learning of the observation region parameter group 102 is performed until no unselected first-person images remain or until the error between the probability map 202 and the observation point information 201 becomes smaller than the predetermined value.

This learning may be an example. The learning may be continued when the number of selected first-person images does not reach a predetermined value even if the error becomes smaller than the predetermined value. The observation point information 201 includes the information representing the observation point position but, in addition to or in place of such information, may include an image resulting from applying a Gaussian filter to the true observation point position, for example.

FIG. 4 illustrates the learning of the observation region parameter group 102. However, the learning may be performed on at least one of the parameter groups 104 and 106 in the same manner. Namely, the parameter group may be updated to keep an error between the output as a result of processing by the processing portion using the parameter group and the correct output as training data to be smaller than a predetermined value.

Although not illustrated in FIG. 4, the observation region parameter update portion 203 may or may not be included in the observed-object recognition portion 107 illustrated in FIG. 1.

Second Embodiment

The description below explains the second embodiment. Differences from the first embodiment will be mainly described. Common points with the first embodiment will be omitted or simplified.

Figure 5:
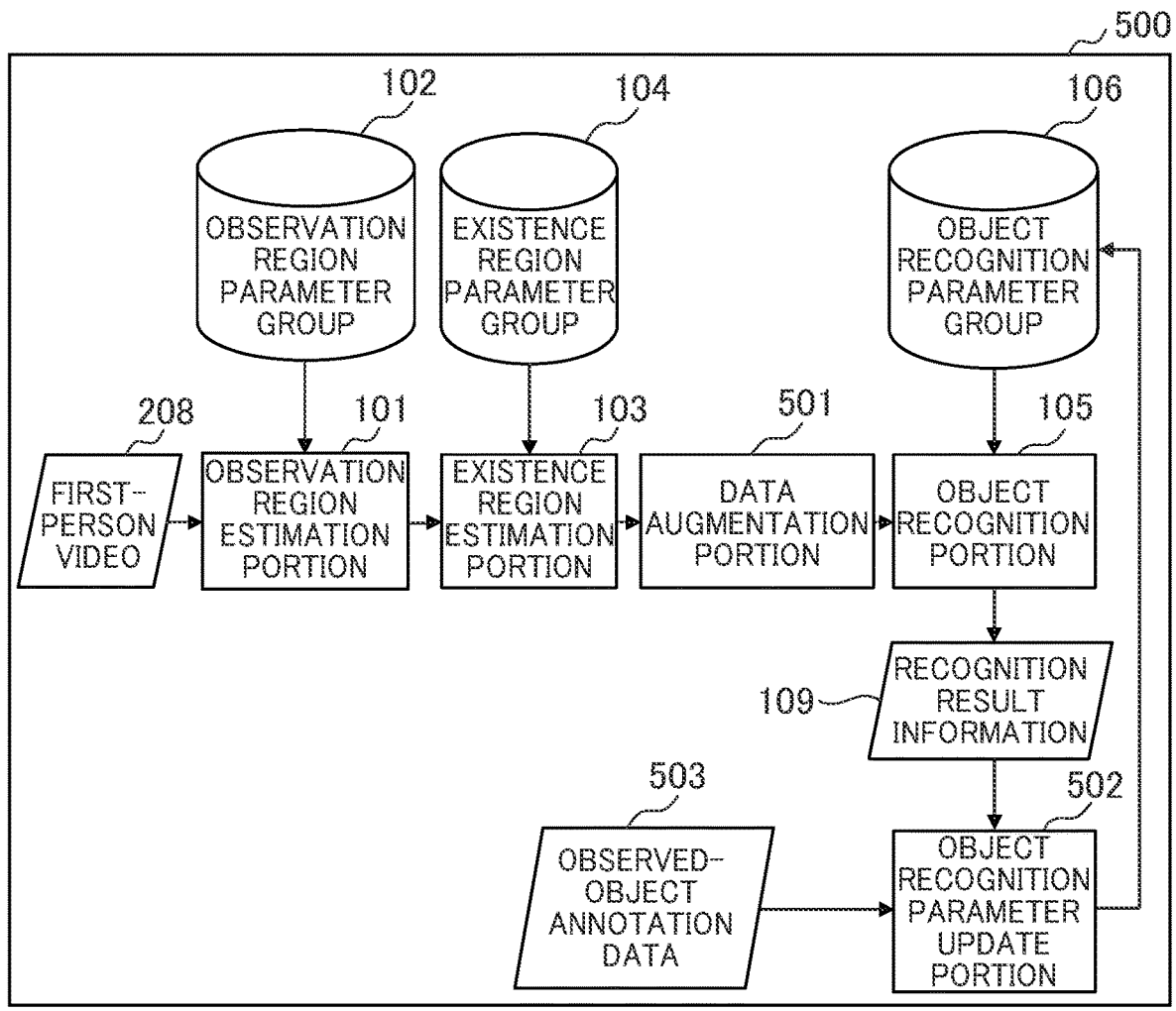
FIG. 5 illustrates a function configuration of the observed-object recognition system according to a second embodiment.

FIG. 5 illustrates a function configuration of the observed-object recognition system according to the second embodiment.

An observed-object recognition system 500 according to the second embodiment includes a data augmentation portion 501 and an object recognition parameter update portion 502 in addition to the elements described in the first embodiment. Although not illustrated in FIG. 5, at least one of the data augmentation portion 501 and the object recognition parameter update portion 502 may or may not be included in the observed-object recognition portion 107 illustrated in FIG. 1.

The data augmentation portion 501 performs data augmentation.

Figure 6:
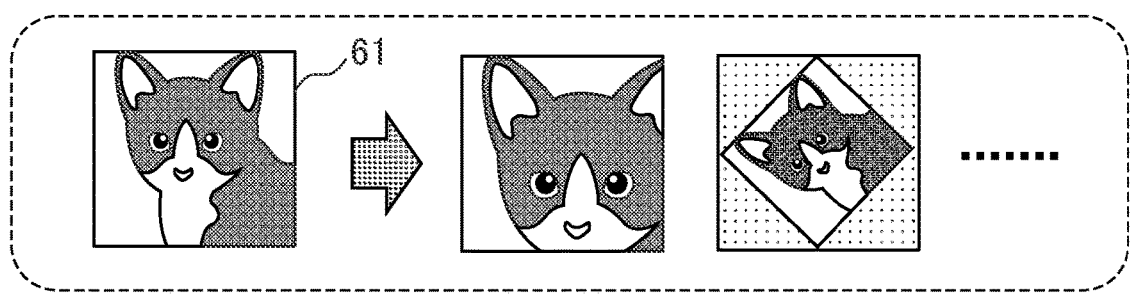
FIG. 6 illustrates general data augmentation.

As illustrated in FIG. 6, the general data augmentation can provide multiple images such as an enlarged image and a rotated image by performing a process such as an enlargement or a rotation on an original image 61. Namely, training data can be increased.

However, in general, the data augmentation randomly processes images. As described above, the shape and size of an observed object depend on the object. The relative orientation of the observed object with respect to the first-person image and the region occupied by the observed object in the first-person image depend on the first-person image (the operator capturing the object). Random image processing does not necessarily provide an appropriate image as training data. For example, an image lacking part of the object may be regarded as training data.

According to the present embodiment, the data augmentation portion 501 determines a partial image of the first-person image in the first-person video 208 (training data) based on at least one of the estimated observation region and the estimated existence region. The data augmentation on the determined partial image determines multiple images input to the object recognition portion 105 for learning of the object recognition portion 105. The data augmentation portion 501 also performs the data augmentation on the partial image based on at least one of the estimated observation region and the estimated existence region. Therefore, it is possible to reliably increase the training data appropriately containing the object and expect improved accuracy of the object recognition portion 105. For example, there is a possibility of data augmentation using the information on a region around the estimated existence region (or observation region) and/or data augmentation containing contextual information using a probability map. As a result, it is possible to expect learning to make the object recognition portion 105 more accurate. The description below explains a specific example.

A partial image as training data can be acquired by extracting a region determined based on at least one of the observation region and the existence region from the first-person image. The "region determined based on at least one of the observation region and the existence region" may correspond to a region composed of a pixel group (one or more pixels) corresponding to a probability group (one or more probabilities) greater than or equal to a predetermined threshold in a probability map (comparable to an example of the observation region); all or part of the observation region; a rectangular (or otherwise shaped) region to cover all or part of the observation region; all or part of the existence region; or a rectangular (or otherwise shaped) region to cover all or part of the existence region. These partial images are used as original images, making it possible to expect significant data augmentation.

Image processing is performed on such partial images based on at least one of the observation region and the existence region. Therefore, it can be expected that each of the images acquired from the image processing on the partial images is an appropriate image as training data for learning of the object recognition portion 105. For example, the image can be expected to appropriately contain the object. When the observation region is horizontally long as a whole, for example, it is possible to perform the data augmentation containing context information that causes the horizontal movement amount of the original image (image part) to be larger than the vertical movement amount. It is possible to expect to improve the accuracy of the object recognition portion 105.

As described above, an image as appropriate training data is acquired from the first-person image based on at least one of the observation region and the existence region. The degree of image processing on the image or the processing content is determined based on at least one of the observation region and the existence region. It is possible to increase appropriate training data.

Learning of the object recognition parameter group 106 is performed as an example of learning of the object recognition portion 105. The learning may be performed as follows, for example. The object recognition parameter update portion 502 may update the object recognition parameter group 106 for each of the images (training data) generated by the data augmentation portion 501 based on the recognition result information 109 representing the object recognized by the object recognition portion 105 from the image and previously provided observed-object annotation data 503. For example, suppose the recognized object is a tool. Then, the observed-object annotation data 503 may be an object name (label) such as "screwdriver," "wrench," or "nipper". The observed-object annotation data 503 may be represented in the form of a so-called one-hot-vector. For example, correct answer labels such as [1, 0, 0] for "screwdriver," [0, 1, 0] for "wrench," and [0, 0, 1] for "nippers" may be used to solve a problem of identifying three classes such as "screwdriver," "wrench," and "nippers".

Third Embodiment

The description below explains the third embodiment. Differences from the first embodiment will be mainly described. Common points with the first embodiment will be omitted or simplified.

Figure 7:
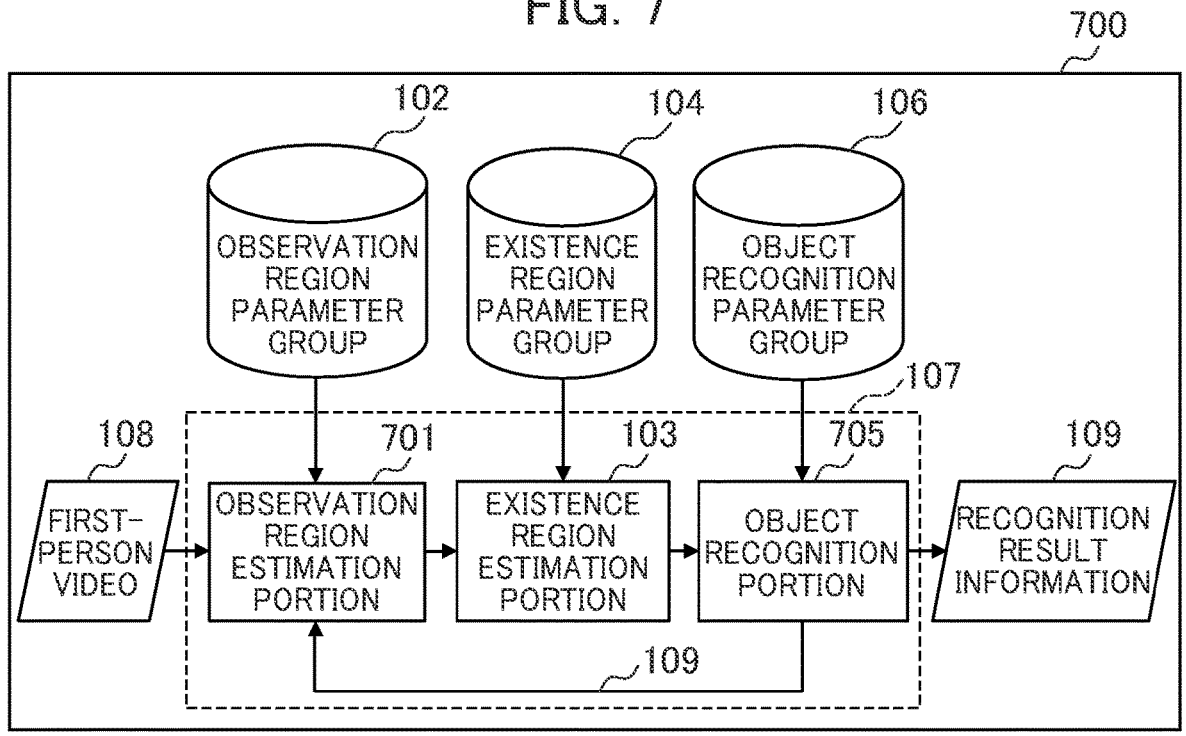
FIG. 7 illustrates a function configuration of the observed-object recognition system according to a third embodiment.

FIG. 7 illustrates a function configuration of the observed-object recognition system according to the third embodiment.

An observed-object recognition system 700, according to the third embodiment, includes an observation region estimation portion 701 and an object recognition portion 705 in place of the observation region estimation portion 101 and the object recognition portion 105.

The object recognition portion 705 feeds back the recognition result information 109, namely, the information representing the object recognized from first-person image T, to the observation region estimation portion 701. The observation region estimation portion 701 corrects the observation region estimated for first-person image T or its subsequent first-person image (T+1) (an example of at least one subsequent first-person image) based on the feedback recognition result information 109. The existence region estimation portion 103 estimates an existence region in first-person image T or first-person image (T+1) based on the corrected observation region. Namely, the feedback of the recognition result information 109 may be applied to the same first-person image T or first-person image (T+1). The "first-person image (T+1)" corresponds to a first-person image next to first-person image T.

The present embodiment can allow the observation region estimation portion 701 to recognize what the observed object is, from the recognition result information 109 on first-person image T, and then process first-person image T or (T+1). Therefore, it is possible to expect to improve the accuracy of estimating an observation region for first-person image T or (T+1) and consequently improve the accuracy of recognizing the observed object. The description below explains a specific example.

Figure 8:
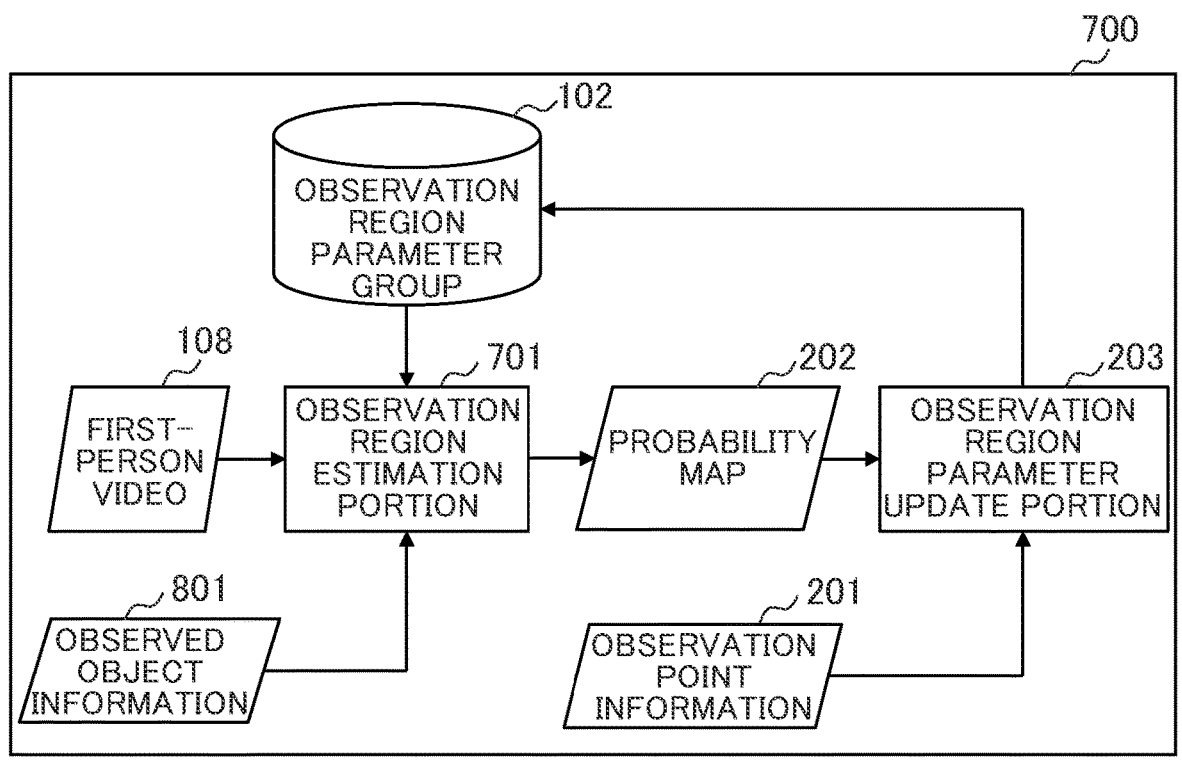
FIG. 8 illustrates a flow of learning an observation region parameter group according to the third embodiment.

For example, if the observed object recognized from first-person image T is a person, then the face is highly likely to be more accurate as being the observed object. For example, if the observed object recognized from first-person image T is a screwdriver, the tip of the screwdriver is highly likely to be more accurate as being the observed object. Which part of that object is more accurate as being the observed object depends on what is recognized as the observed object. As illustrated in FIG. 8, learning of the observation region estimation portion 701 (learning of the observation region parameter group 102) may use observed object information 801 containing the correspondence between the recognition result information and the information representing the observed part. Specifically, the observed object information 801 can be expressed as a C-dimensional vector, where "C" denotes the number of categories for possible observed objects. More specifically, it may be favorable to use a one-hot-vector format representing only the element corresponding to the object to be observed as "1," and the other elements as "0" or a format representing the probability of each category assumed to be an observed object.

During the inference, the observation region estimation portion 701 first calculates the probability map 202 for first-person image T. At this time, the observation region estimation portion 701 may be supplied with the recognition result information 109, namely, the information assigning the same value to all object categories. The object is then recognized from first-person image T. The object recognition portion 705 inputs the recognition result information 109 to the observation region estimation portion 701 in the form of the one-hot-vector or the probability described above, for example. The observation region is estimated (corrected) based on the input recognition result information 109. Such a loop may be repeated a predetermined number of times or may be repeated until the result of estimating the observation region converges. The object recognition portion 705 (observed-object recognition portion 107) may output the recognition result information 109, namely, the final result of object recognition after the loop repetition is complete.

Fourth Embodiment

The description below explains the fourth embodiment. Differences from the first embodiment will be mainly described. Common points with the first embodiment will be omitted or simplified.

Figure 9:
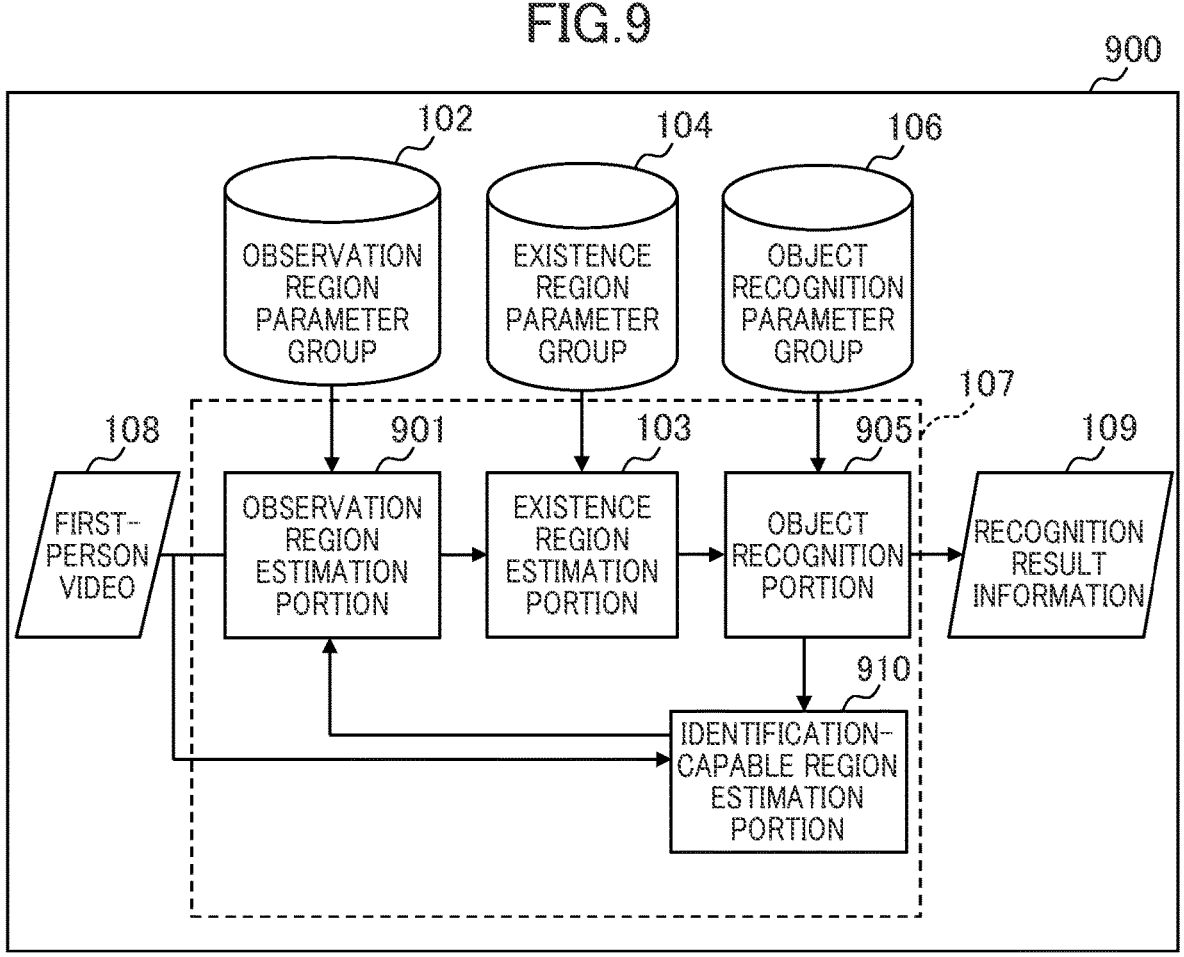
FIG. 9 illustrates a function configuration of the observed-object recognition system according to a fourth embodiment.

FIG. 9 illustrates a function configuration of the observed-object recognition system according to the fourth embodiment.

An observed-object recognition system 900, according to the fourth embodiment, includes an observation region estimation portion 901 and an object recognition portion 905 in place of the observation region estimation portion 101 and the object recognition portion 105. The observed-object recognition system 900 further includes an identification-capable region estimation portion 910. The identification-capable region estimation portion 910 may or may not be included in the observed-object recognition portion 107.

The object recognition portion 905 inputs recognition result information 109, namely, the first-person image information representing an object recognized by T, to the identification-capable region estimation portion 910. First-person image T is input to the identification-capable region estimation portion 910.

Figure 10:
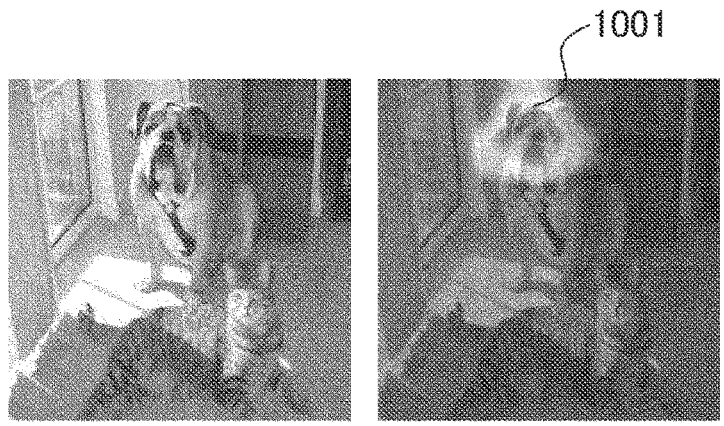
FIG. 10 illustrates an identification-capable region.

Based on the recognition result information 109, the identification-capable region estimation portion 910 estimates an identification-capable region that belongs to first-person image T and is relatively highly likely to allow a specific object to exist. The "identification-capable region" described here is illustrated as an identification-capable region 1001 in FIG. 10. For example, suppose the recognition result information 109 represents "dog" as an object. Then, the identification-capable region 1001 is assumed to contain the face of a dog. The identification-capable region estimation portion 910 identifies an object represented by the recognition result information 109, based on the object, calculates the possibility (such as a score providing the probability) of the existence of a specific object for each of pixels configuring first-person image T, and determines the identification-capable region 1001, namely, the region indicating the calculated possibility being relatively high. The identification-capable region 1001 can be expressed by expressing pixels in the identification-capable region 1001 in a display mode according to degrees of the possibility. For example, the identification-capable region 1001 can be represented as a so-called heat map.

The observation region estimation portion 901 corrects the region estimated for first-person image T or first-person image (T+1) (an example of at least one subsequent first-person image) based on the estimated identification-capable region. The existence region estimation portion 103 estimates an existence region in first-person image T or first-person image (T+1) based on the corrected observation region.

The present embodiment can estimate a region highly likely to contain a specific object (such as part of the recognized object) depending on what is recognized as the object from first-person image T and process first-person image T or (T+1) based on the estimated region. Therefore, it is possible to expect to improve the accuracy of estimating an observation region for first-person image T or (T+1) and consequently improve the accuracy of recognizing the observed object. The description below explains a specific example.

For example, construct a model (observation region estimation portion 901) capable of inputting information representing the identification-capable region (such as heat map information) as the observed object information and train such a model in advance. For example, the inference first estimates an existence region and recognizes an object by using an input such as a probability map assigning the same value to all pixels (or a probability map generated by the observation region estimation portion 101). As a result, the observation region estimation portion 901 is supplied with the information (output from the identification-capable region estimation portion 910) about the object indicating the highest score (an example of possibility). The object is recognized again. Such a loop may be repeated a predetermined number of times or may be repeated until the result of estimating the observation region converges.

The identification-capable region estimation portion 910 may output not only the information about the object indicating the highest score but also the information about the top k objects (k is a natural number).

Fifth Embodiment

The description below explains the fifth embodiment. Differences from the first embodiment will be mainly described. Common points with the first embodiment will be omitted or simplified.

Figure 11:
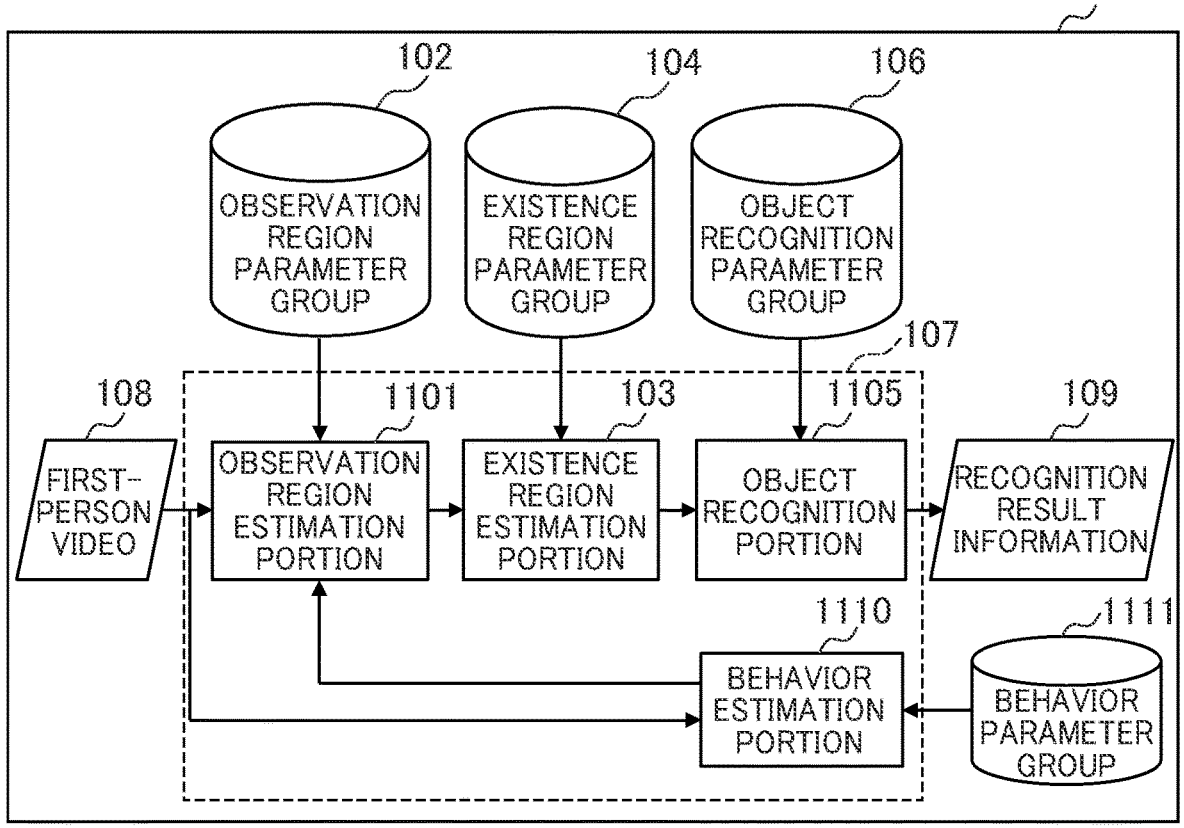
FIG. 11 illustrates a function configuration of the observed-object recognition system according to a fifth embodiment.

FIG. 11 illustrates a function configuration of the observed-object recognition system according to the fifth embodiment.

An observed-object recognition system 1100, according to the fifth embodiment, includes an observation region estimation portion 1101 and an object recognition portion 1105 in place of the observation region estimation portion 101 and the object recognition portion 105. The observed-object recognition system 1100 includes a behavior estimation portion 1110. The observed-object recognition system 1100 manages a behavior parameter group 1111. The behavior parameter group 1111 may be stored in the storage apparatus 302 (see FIG. 3).

The object recognition portion 1105 supplies the behavior estimation portion 1110 with the recognition result information 109, namely the first-person image information representing object recognized by T. First-person image T is input to the behavior estimation portion 1110.

The behavior estimation portion 1110 estimates the behavior of an operator who captured first-person image T, based on first-person image T and the recognition result information 109 as inputs. Based on the estimated behavior, the observation region estimation portion 1101 corrects the observation region estimated for first-person image T or first-person image (T+1) (an example of at least one subsequent first-person image). The existence region estimation portion 103 estimates the existence region in first-person image T or (T+1) based on the corrected observation region.

The present embodiment estimates the behavior of the operator handling the recognized object and estimates the observation region based on the estimated behavior. As a result, it is possible to process first-person image T or (T+1) based on the estimated region. Therefore, it is possible to expect to improve the accuracy of estimating an observation region for first-person image T or (T+1) and consequently improve the accuracy of recognizing the observed object. The description below explains a specific example.

For example, suppose the recognized object is a "screwdriver" and the estimated behavior is "to try to grab the screwdriver". Then, the observed object is highly likely to be a grip. For example, suppose the recognized object is a "screwdriver" and the estimated behavior is "to screw". Then, the observed object is highly likely to be the tip of the screwdriver. It is possible to improve the accuracy of recognizing the observed object by feeding back the pair of the recognized object and the estimated behavior to the estimation of the observation region.

The behavior estimation portion 1110 may or may not be included in the observed-object recognition portion 107.

Figure 12:
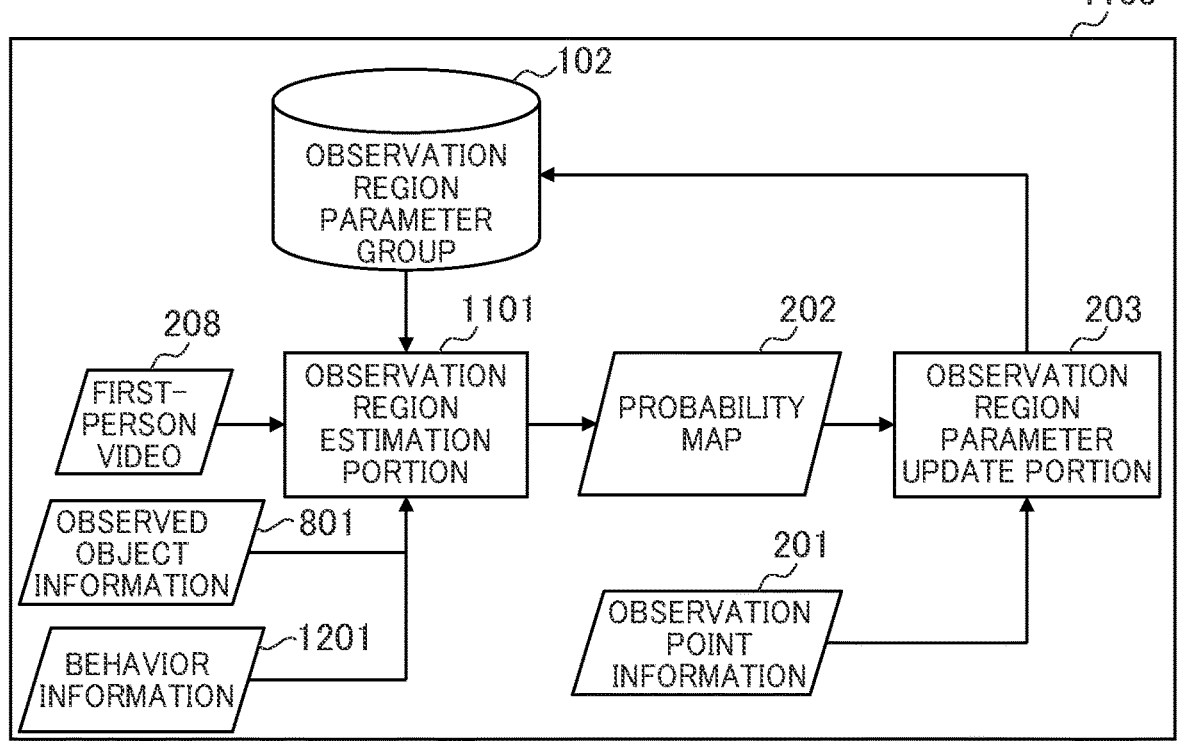
FIG. 12 illustrates a flow of learning an observation region parameter group according to the fifth embodiment.

The learning of the observation region parameter group 102 (learning of the observation region estimation portion 1101) may be performed as illustrated in FIG. 12, for example. Namely, a set of first-person video and data annotating the type of behavior may be provided as behavior information 1201. The behavior information 1201 may be used as training data. It may be favorable to adopt at least part of the description concerning FIG. 4 or FIG. 8.

Sixth Embodiment

The description below explains the sixth embodiment. Differences from the first embodiment will be mainly described. Common points with the first embodiment will be omitted or simplified.

Figure 13:
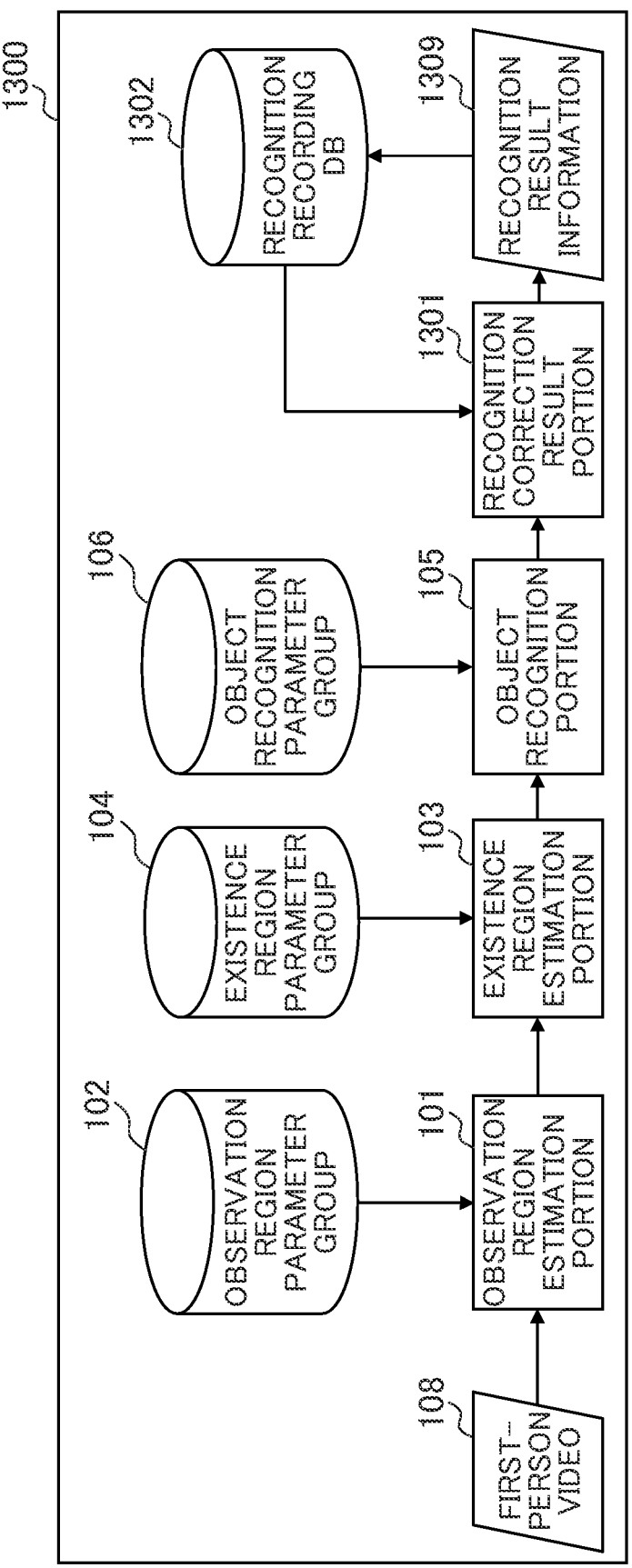
FIG. 13 illustrates a function configuration of the observed-object recognition system according to a sixth embodiment.

FIG. 13 illustrates a function configuration of the observed-object recognition system according to the sixth embodiment.

An observed-object recognition system 1300, according to the sixth embodiment, includes a recognition correction portion 1301. The observed-object recognition system 1300 manages a recognition recording DB 1302. Although not illustrated in FIG. 13, recognition correction portion 1301 may or may not be included in the observed-object recognition portion 107 illustrated in FIG. 1. The recognition recording DB 1302 may be stored in the storage apparatus 302 (see FIG. 3). The recognition recording DB 1302 stores the recognition result information 1309 on chronological first-person images in the first-person video 108. The recognition result information 1309 may be comparable to the recognition result information itself (the above-described recognition result information 109) output from object recognition portion 105 or the recognition result information after being corrected by the recognition correction portion 1301.

The recognition correction portion 1301 identifies a minor first-person image that belongs to chronological first-person images in the first-person video 108 and contains a relatively small amount of identical recognition result information, based on the recognition recording DB 1302 (recognition result information on chronological first-person images). The recognition correction portion 1301 deletes or corrects the recognition result information on the minor first-person image based on the relative position of the minor first-person image in the first-person video 108 with reference to a major first-person image that belongs to chronological first-person images in the first-person video 108 and contains a relatively large amount of identical recognition result information. As a result, it is possible to optimize the recognition result information stored in the recognition recording DB 1302. The description below explains a specific example.

The recognition correction portion 1301 receives the output of recognition result information from the object recognition portion 105 and stores the recognition result information in the recognition recording DB 1302. The recognition correction portion 1301 references the recognition recording DB 1302 periodically or at a predetermined timing (each time the recognition result information is stored in the recognition recording DB 1302, for example). The recognition correction portion 1301 determines the presence or absence of a minor first-person image that belongs to chronological first-person images in the first-person video 108 and contains a relatively small amount of identical recognition result information.

Figure 14:
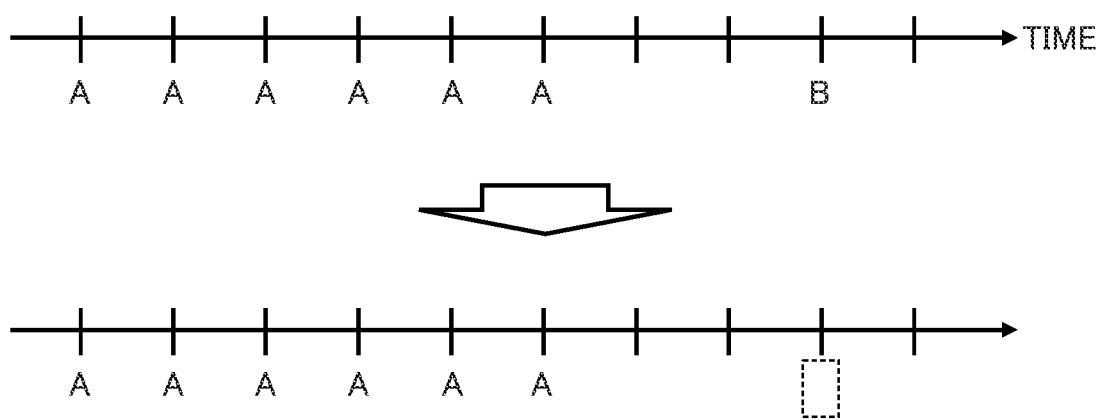
FIG. 14 illustrates deletion of recognition result information.

For example, as illustrated in FIG. 14, suppose only one minor first-person image containing recognition result information "B" is identified. Further, suppose the minor first-person image is separated by a certain distance or more (a specified number of first-person images, for example) from the major first-person image containing a relatively large amount of identical recognition result information "A" in the first-person video 108. In this case, as illustrated in FIG. 14, the recognition correction portion 1301 assumes an object to be not watched when the object is viewed during too short a period to keep recognition result information "B" as an inspection record. Then, the recognition correction portion 1301 deletes the recognition result information "B".

Figure 15:
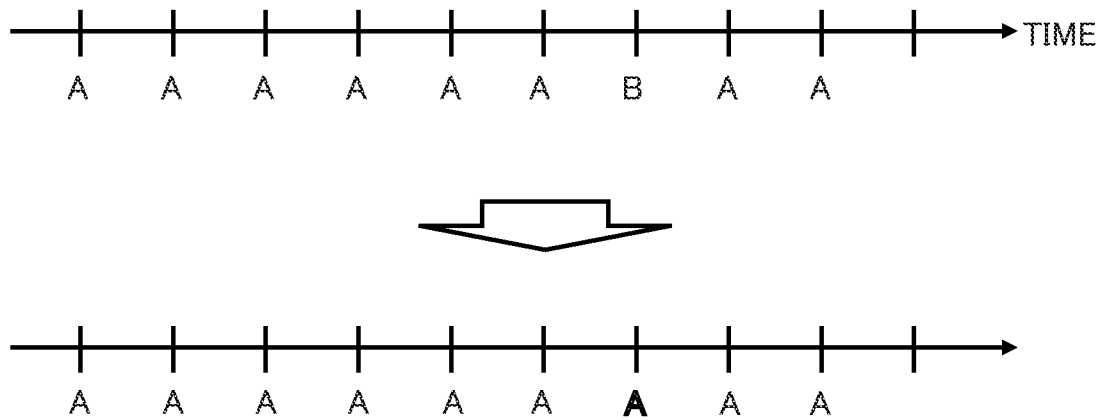
FIG. 15 illustrates correction of recognition result information.

For example, as illustrated in FIG. 15, suppose only one minor first-person image containing recognition result information "B" is identified. Further, suppose the minor first-person image exists among major first-person images containing a relatively large number of the same recognition result information "A". In this case, as illustrated in FIG. 15, the recognition correction portion 1301 corrects the recognition result information from "B" to "A," assuming that the same object was consistently watched before and after the recognition, in other words, determining that the result of watching another object for only a short time was incorrect.

Seventh Embodiment

The description below explains the seventh embodiment. Differences from the first embodiment will be mainly described. Common points with the first embodiment will be omitted or simplified.

Figure 16:
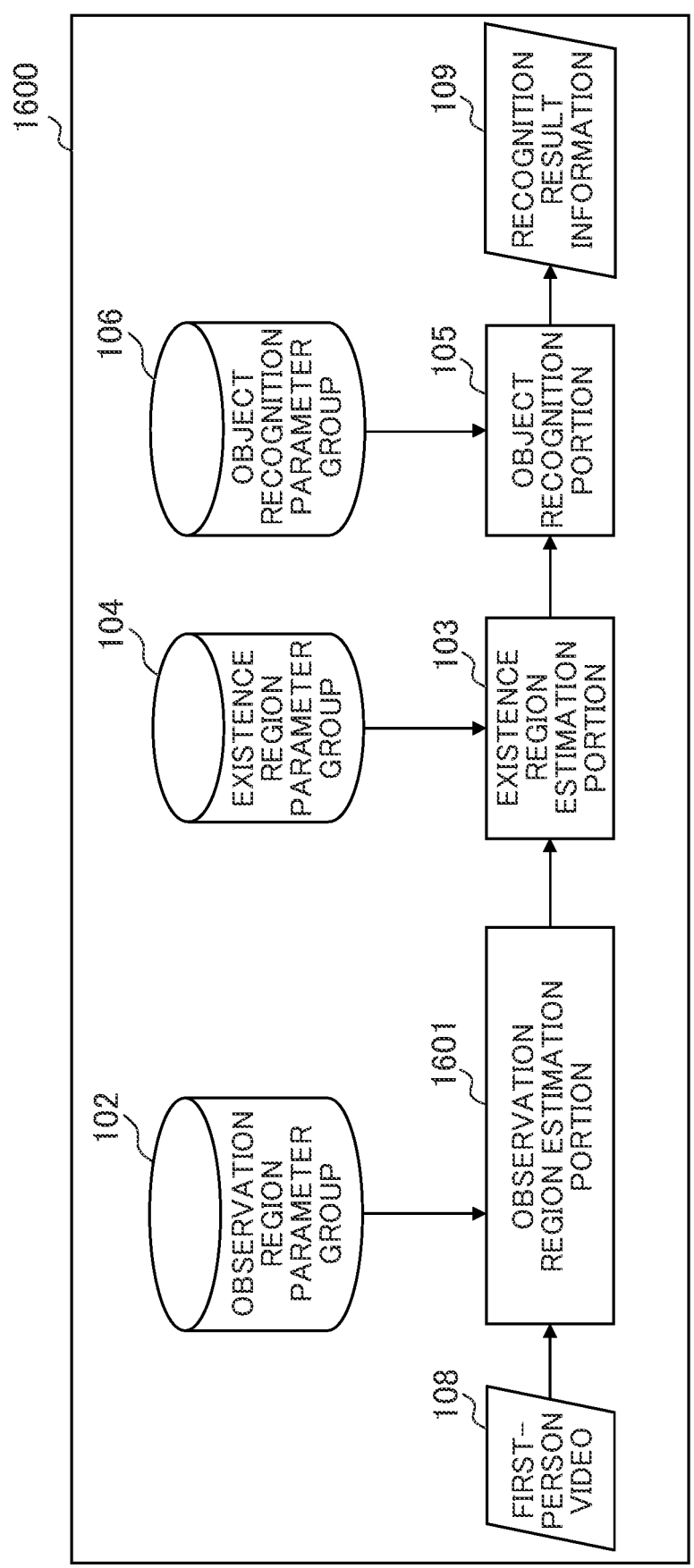
FIG. 16 illustrates a function configuration of the observed-object recognition system according to a seventh embodiment.
Figure 17:
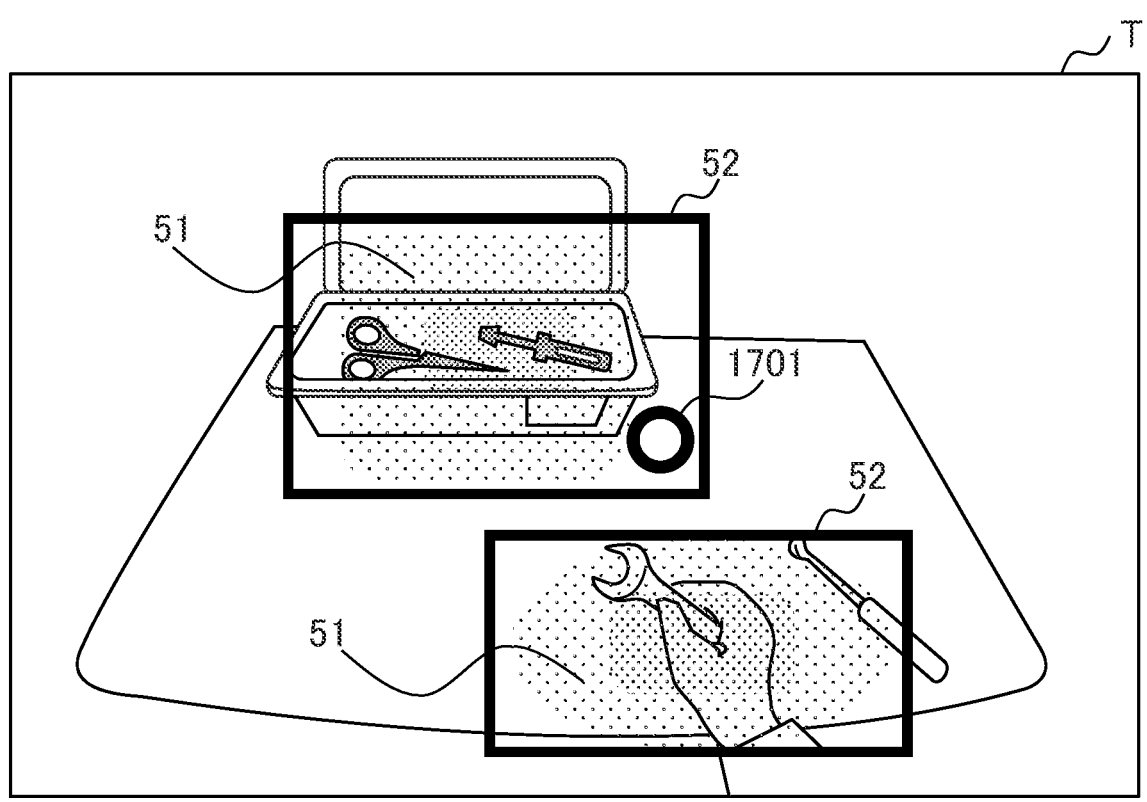
FIG. 17 illustrates one first-person image in the first-person video.

FIG. 16 illustrates a function configuration of the observed-object recognition system according to the seventh embodiment. FIG. 17 illustrates one first-person image T in the first-person video.

The observed-object recognition system 1100, according to the seventh embodiment, includes an observation region estimation portion 1601 in place of the observation region estimation portion 101. The observation region estimation portion 1601 estimates multiple observation regions 51 by applying clustering to a probability map (an example of the first-person image possibility distribution representing the possibility of an observation point belonging to each of multiple positions in the first-person image) generated for first-person image T. The existence region estimation portion 103 estimates the existence region 52 for each of the observation regions 51. The object recognition portion 105 recognizes an object. Multiple observed objects can be recognized in this manner. The description below explains a specific example.

An operator (such as a skilled operator) may visually inspect multiple objects in one scene. For example, as illustrated in FIG. 17, the operator may visually inspect objects included in each of the two observation regions 51 while turning the line of sight approximately toward a center 1701. The present embodiment can recognize multiple observed objects by applying clustering to the probability map and estimating the existence region for each of the observation regions 51 (clusters).

The observation region estimation portion 1601 generates one or more clusters from the probability map by using any existing clustering method such as a hierarchical clustering method. The observation region estimation portion 1601 may process the probability map based on a certain threshold value and perform clustering by using only the (x, y) coordinates of points higher than the threshold value or may perform clustering on three-dimensional inputs of (x, y, s) including probability (an example of observation point score) s. The existence region estimation portion 103 estimates the existence region of an object for each of the generated clusters. The object recognition portion 105 recognizes the object. The operator may successively watch multiple objects or compare multiple objects without particularly moving the operator's head (namely, causing little change in the acquired first-person video). Even in such a case, the observed-object recognition system 1600 can recognize these objects.

Eighth Embodiment

The description below explains the eighth embodiment. Differences from the first embodiment will be mainly described. Common points with the first embodiment will be omitted or simplified.

Figure 18:
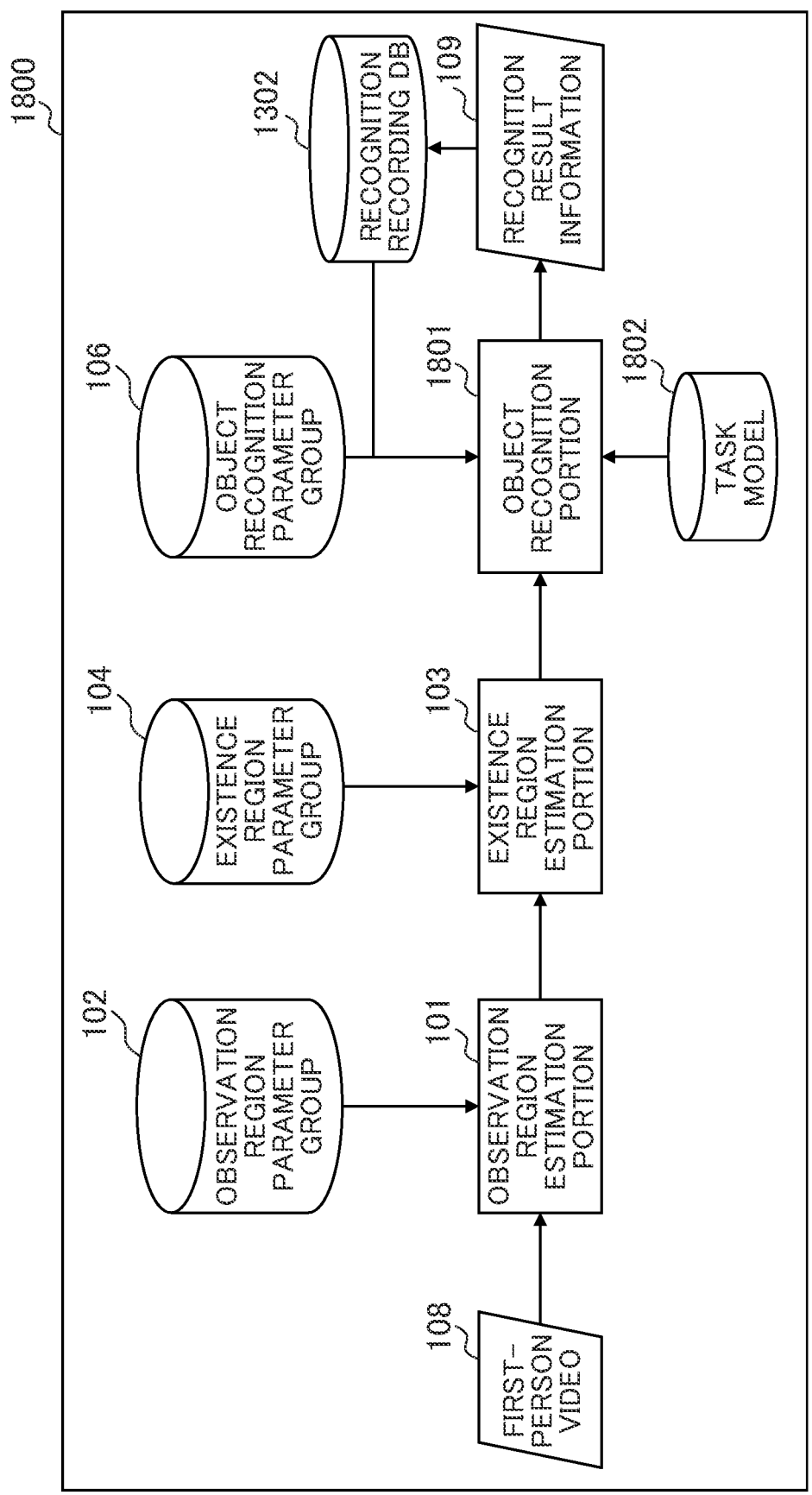
FIG. 18 illustrates a function configuration of the observed-object recognition system according to an eighth embodiment.

FIG. 18 illustrates a function configuration of the observed-object recognition system according to the eighth embodiment.

An observed-object recognition system 1800, according to the eighth embodiment, includes an object recognition portion 1805 in place of the object recognition portion 105. The observed-object recognition system 1100 manages the recognition recording DB 1302 (see FIG. 13) and a task model 1802. The recognition recording DB 1302 and the task model 1802 may be stored in the storage apparatus 302 (see FIG. 3).

The task model 1802 represents the chronological regularity of objects contained in the chronological first-person images in the first-person video 108. The recognition recording DB 1302 stores recognition result information on each of the chronological first-person images in the first-person video 108. The object recognition portion 1805 recognizes an object in the estimated existence region of first-person image T based on the task model 1802 and the recognition recording DB 1302. It is possible to expect to further improve the accuracy of recognizing objects. The description below explains a specific example.

A visual inspection is performed according to a procedure manual that prescribes a working sequence. The information resulting from modeling such a procedure manual provides an example of the task model 1802. Task model 1802 provides the regularity of the sequence of objects to be watched. For example, as illustrated in FIG. 19, a table may be used as the task model 1802. The table arranges information about objects to be watched in the column direction and information about objects to be watched next in the row direction. The first row of the table shows "0.1" as the probability of viewing object A again, "0.8" as the probability of viewing object B, and "0.1" as the probability of viewing object C after object A is viewed. The object recognition portion 1805 recognizes objects based on the task model 1802 and the recognition results identified so far from the recognition recording DB. An example is to perform the calculation such as equation 1 described below.

$$\underset{o_t}{\operatorname{argmax}} \hat{p}(o_t) p(o_t \mid o'_{t-1})  \qquad \text{[Equation 1]}$$

$$X = \hat{p}(o_t)$$

$$Y = p(o_t \mid o'_{t-1})$$

In equation 1, element X denotes the probability of watching object O in first-person image t. In this case, the probability is acquired without the use of the task model 1802 or previous recognition results. In equation 1, element Y is the information identified from the task model 1802 and denotes the probability of watching object O in the next first-person image t when object O' was watched in the immediately preceding first-person image (t 1). According to equation 1, element X denotes the probability of equating the recognized object with the targeted object, and element Y (preceding first-person image (t−1)) is identified from the task model 1802. Element Y is applied to element X for each of the objects possibly recognized from first-person images, where element Y reflects the sequence property in terms of the object identified from element Y. Then, it is possible to calculate a more accurate probability of equating the recognized object with the identified object. The information representing the object assigned the highest calculated probability is output as the recognition result information.

Ninth Embodiment

The description below explains the ninth embodiment. Differences from the first embodiment will be mainly described. Common points with the first embodiment will be omitted or simplified.

Figures 20, 21:
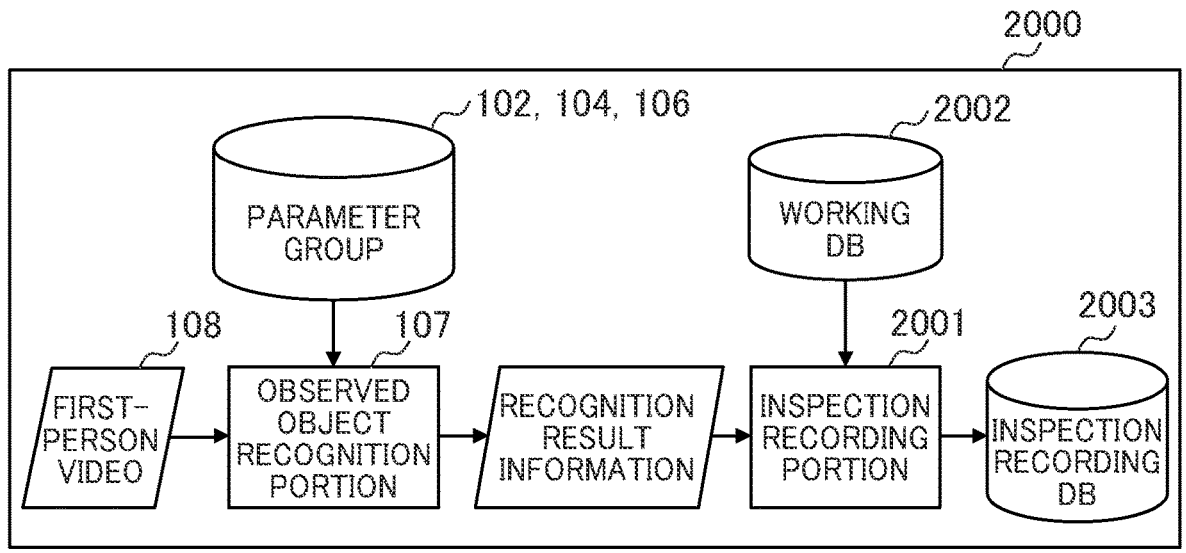
FIG. 20 illustrates a function configuration of the observed-object recognition system according to a ninth embodiment.
FIG. 21 illustrates a working DB.

FIG. 20 illustrates a function configuration of the observed-object recognition system according to the ninth embodiment.

An observed-object recognition system 2000, according to the ninth embodiment, includes an inspection recording portion 2001. The observed-object recognition system 2000 manages a working DB 2002 and an inspection recording DB 2003. The working DB 2002 and the inspection recording DB 2003 may be stored in the storage apparatus 302 (see FIG. 3). The working DB 2002 contains information about an inspection object to be visually inspected. The inspection recording DB 2003 contains inspection recording information that represents inspection records.

At a manufacturing floor (or a maintenance site), it is desirable to keep operation records for various purposes such as preventing fraud in the inspection or analyzing the working efficiency. However, the manual entry of the records is not only time-consuming but also may cause issues such as input errors and intentional falsification of the records.

As a solution, the inspection recording portion 2001 records inspection object information and inspection result information in the inspection recording DB 2003. The inspection object information represents the targeted inspection object in the working DB. The inspection result information contains the recognition result information output from the observed-object recognition portion 107 and may be provided as the inspection object information associated with the recognition result information, for example. Thus, it is possible to keep an objective inspection record without any manual effort. The description below explains a specific example.

As illustrated in FIG. 21, the working DB 2002 contains the inspection object information for each inspection object. In terms of each inspection object, the inspection object information contains information representing at least one of the name of a product provided with the inspection object; ID of a process to visually inspect the inspection object; the name of the inspection object; and the standard inspection time for the inspection object (the time defined as being normally required to inspect the inspection object, for example). At least part of the information stored in the working DB 2002 may reflect the information such as a working procedure manual.

Before the operator starts an operation, it may be favorable to input at least a product ID as the operation target and optionally an operator ID via the GUI (Graphical User Interface) illustrated in FIG. 22, for example. The example here inputs both. The recording may start when a "START" button of the GUI is pressed. The recognition result information from observed-object recognition portion 107 contains information representing the recognized object and information representing the time to have recognized the object (the time of the first-person image where the object was recognized). The information may represent the time when the object was first recognized. Then, the inspection recording portion 2001 temporarily records the time as the start time of the visual inspection time in memory, for example. There may be a case of identifying that the object is not recognized from the recognition result information from the observed-object recognition portion 107. In such a case, the inspection recording portion 2001 temporarily stores the end time of the visual inspection time, namely, the time to identify the object as being unrecognized (or the time of the first-person image where the object was no longer recognized), in memory, for example. In the memory, the inspection recording portion 2001 further records the input product ID and operator ID, the name of the recognized object, and operation date. As illustrated in FIG. 23, the inspection recording portion 2001 allows the inspection recording DB 2003 to record the inspection result information representing the product ID recorded in the memory; the target object (name of the recognized object); the operation date; the operator ID and the visual inspection time (from start time to end time); and the standard inspection time specified from the working DB 2002 based on the target object as a key.

Tenth Embodiment

The description below explains the tenth embodiment. Differences from the ninth embodiment will be mainly described. Common points with the ninth embodiment will be omitted or simplified.

Figures 24, 25:
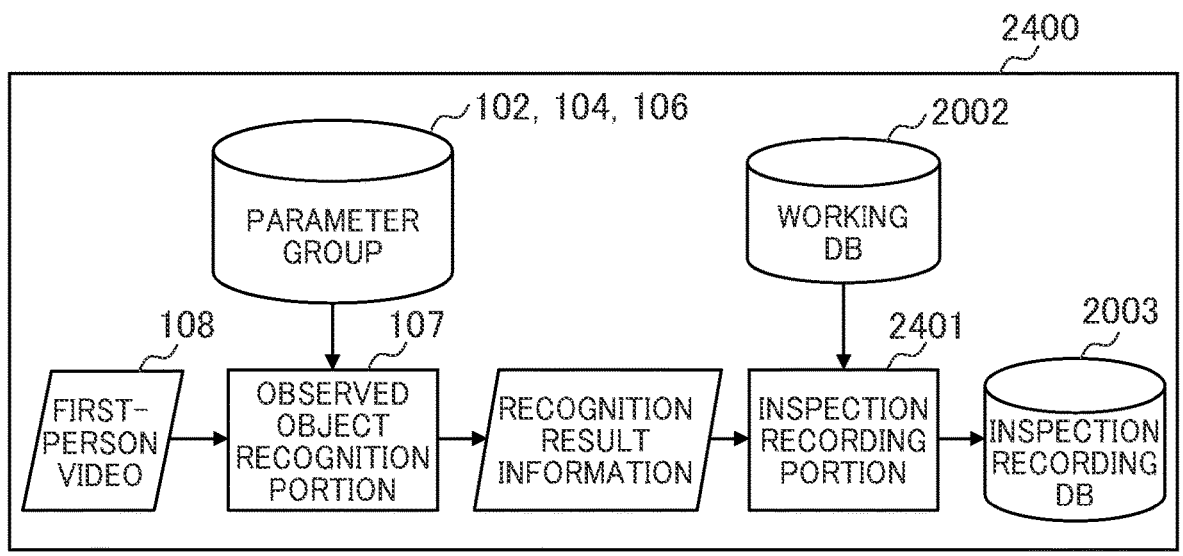
FIG. 24 illustrates a function configuration of the observed-object recognition system according to a tenth embodiment.
FIG. 25 illustrates an inspection recording DB.

FIG. 24 illustrates a function configuration of the observed-object recognition system according to the tenth embodiment.

An observed-object recognition system 2400, according to the tenth embodiment, includes an inspection recording portion 2401 instead of the inspection recording portion 2001. As illustrated in FIG. 25, the inspection recording portion 2401 associates a video part (part of the first-person video) with the inspection result DB 2003. The video part is composed of one or more first-person images belonging to the time during which an object has been continuously recognized in the first-person video, and contains first-person image T (the first-person image where the object is recognized). This makes it possible to confirm the situation of the operation when the inspection record is confirmed later. The video part (the part extracted from the first-person video) may represent the entire video corresponding to the above-mentioned time for the continuous recognition; an estimated existence region extracted from each image in the video; other intermediate output results; or a combination of these.

Eleventh Embodiment

The description below explains the eleventh embodiment. Differences from the ninth embodiment will be mainly described. Common points with the ninth embodiment will be omitted or simplified.

Figure 26:
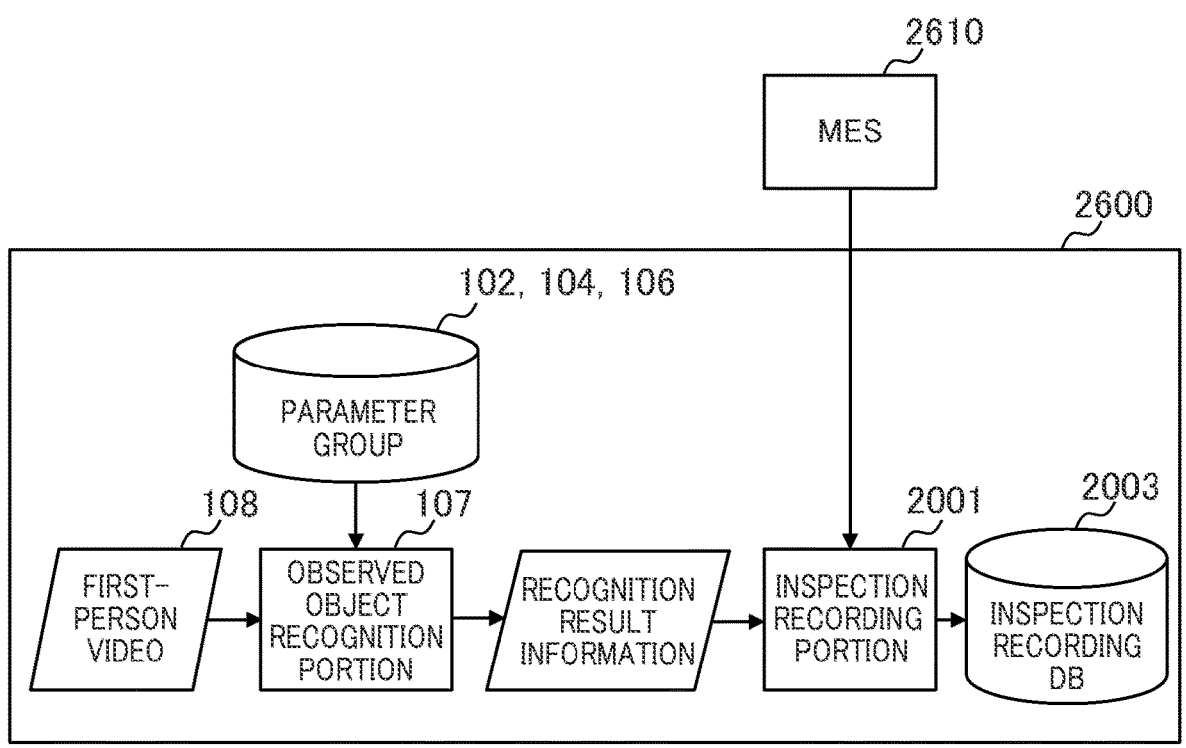
FIG. 26 illustrates a function configuration of the observed-object recognition system according to an eleventh embodiment.

FIG. 26 illustrates a function configuration of the observed-object recognition system according to the eleventh embodiment.

An observed-object recognition system 2600, according to the eleventh embodiment, acquires information from MES (Manufacturing Execution System) 2610, an example of existing systems to manage information about operation processes, in place of (or in addition to) the working DB 2002. The MES 2610 maintains information about operation procedures. Such a system can cooperate with the observed-object recognition system 2600 and more easily store inspection records.

Twelfth Embodiment

The description below explains the twelfth embodiment. Differences from the first embodiment will be mainly described. Common points with the first embodiment will be omitted or simplified.

Figure 27:
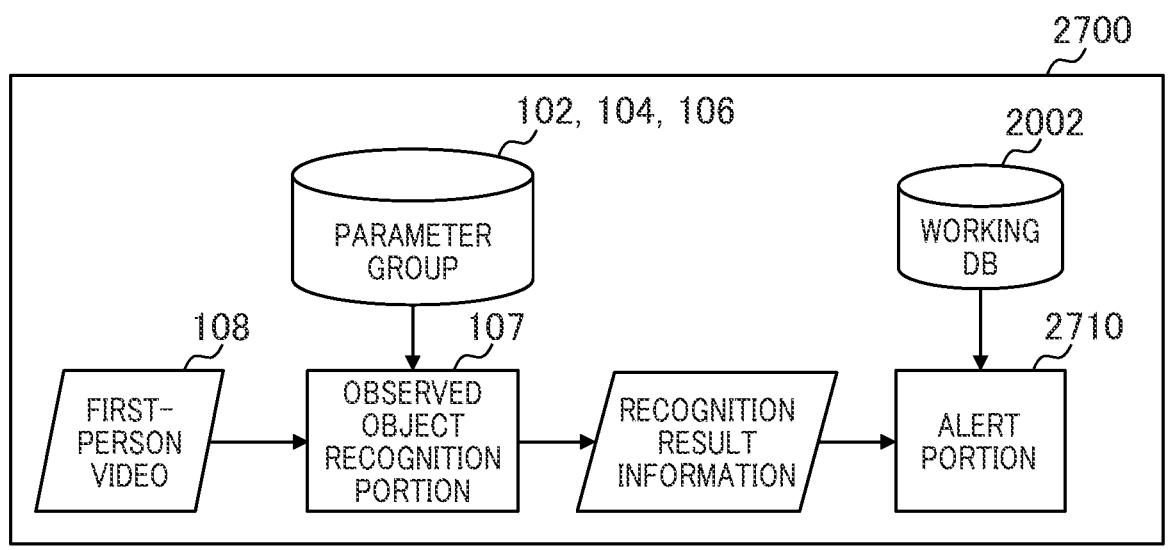
FIG. 27 illustrates a function configuration of the observed-object recognition system according to a twelfth embodiment.

FIG. 27 illustrates a function configuration of the observed-object recognition system according to the twelfth embodiment.

An observed-object recognition system 2700, according to the twelfth embodiment, includes an alert portion 2710. The observed-object recognition system 2700 manages the working DB 2002 illustrated in FIGS. 20 and 21. The alert portion 2710 identifies the standard inspection time (an example of defined inspection time) for the relevant inspection object (such as the same object as the recognized object) from the working DB 2002. The alert portion 2710 determines whether the actual inspection time satisfies the above-described identified standard inspection time. The actual inspection time is calculated based on the number of consecutive first-person images where the object is recognized. The alert portion 2710 outputs an alert when the determination result is false. When an operation error occurs, it is possible to detect it and generate an alert. The description below explains a specific example.

The "actual inspection time" signifies the time during which an object is continuously recognized or visually inspected. For example, the actual inspection time may be identified from the visual time (start time to end time) described in the ninth embodiment.

When "the actual inspection time conforms to the standard inspection time," it may typically signify that the actual inspection time is longer than or equal to the standard inspection time. It is possible to detect an operational error such as unsatisfactory visual inspection due to the actual inspection time shorter than the standard inspection time or a failure to visually inspect all inspection objects on the current product (to leave an object subject to no actual inspection time) and continuation of the operation on the next product. An alert can be generated when such an operation error occurs.

As described above, the "standard inspection time" is an example of the defined inspection time. When "the actual inspection time conforms to the defined inspection time," the meaning is not limited to "the actual inspection time longer than or equal to the standard inspection time". For example, this may signify that "the actual inspection time is shorter than the standard inspection time but a difference between them is smaller than a predetermined value" or that "the actual inspection time is shorter than the standard inspection time but the actual inspection time is longer than or equal to the minimum inspection time". Namely, the "defined inspection time" may include the threshold value for a difference between the actual inspection time and the standard inspection time or may include the lower limit for the actual inspection time. In this case, an alert is generated when the actual inspection time is too shorter than the standard inspection time.

The alert may be given to the operator or to a manager of the operation.

When an alert is issued to the operator, for example, the alert may be generated in the form of sound or vibration of a terminal (such as a smartphone or a smartwatch) carried by the operator. When a monitor is installed at the operation site, an alert may be displayed on the monitor.

When an alert is issued to the operation manager, for example, the alert may be generated in the form of sound or vibration of a terminal carried by the manager. When a monitor is available, the monitor may display an alert including the relevant product ID or operator ID, for example.

Thirteenth Embodiment

The description below explains the thirteenth embodiment. Differences from the ninth embodiment will be mainly described. Common points with the ninth embodiment will be omitted or simplified.

Figure 28:
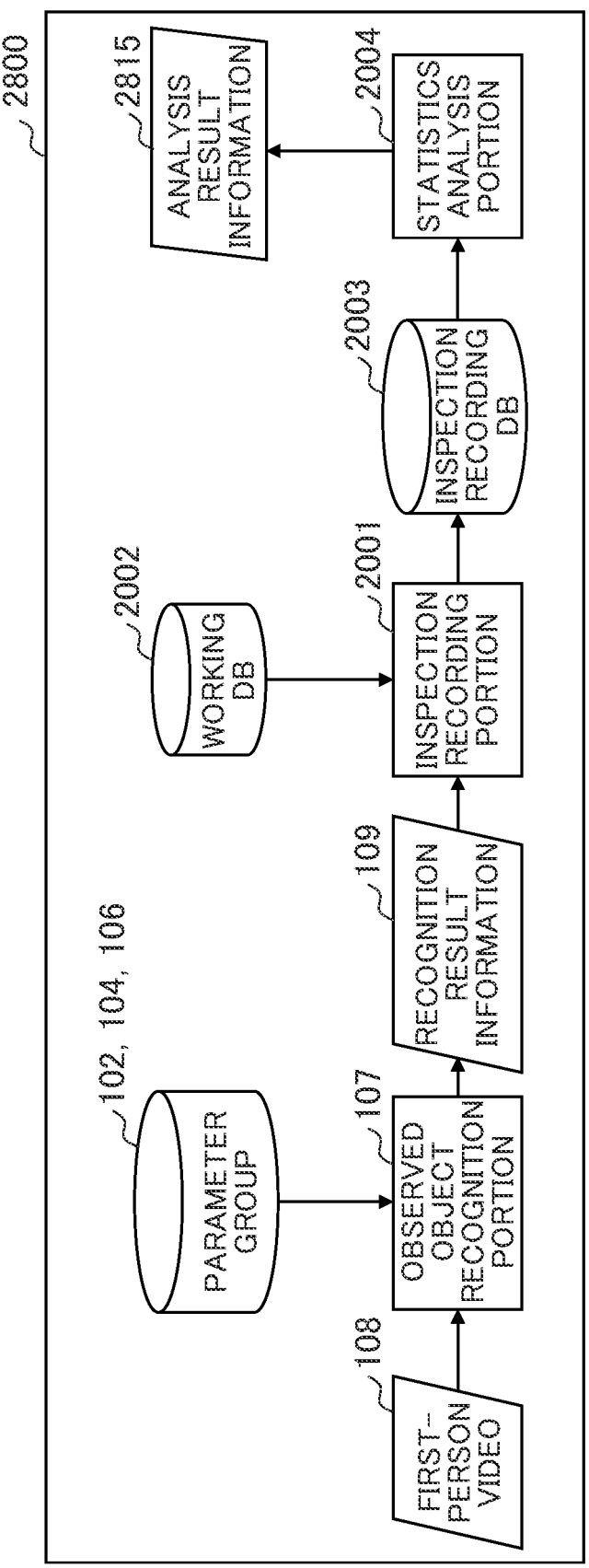
FIG. 28 illustrates a function configuration of the observed-object recognition system according to a thirteenth embodiment.

FIG. 28 illustrates a function configuration of the observed-object recognition system according to the thirteenth embodiment.

An observed-object recognition system 2800, according to the thirteenth embodiment, includes a statistical analysis portion 2810. The statistical analysis portion 2810 statistically analyzes the inspection recording DB 2003 and outputs analysis result information 2815 representing an analysis result. It can be expected to support an appropriate operation (to anticipate an operation error from the analysis result information 2815 and therefore prevent the operation error from occurring, for example). The description below explains a specific example.

The present embodiment can acquire a work record including intermediate information such as the visual inspection time (start time to end time) in addition to information such as whether to have performed the visual inspection. The proficiency level of operators can be estimated by analyzing the transition of visual time (chronological visual time) for the same object on an operator basis (by analyzing whether the visual inspection time is longer than or equal to the standard inspection time, in consideration of the transition of the difference between the visual inspection time and the standard inspection time, for example). Therefore, it is possible to anticipate signs of operation errors.

Figure 29:
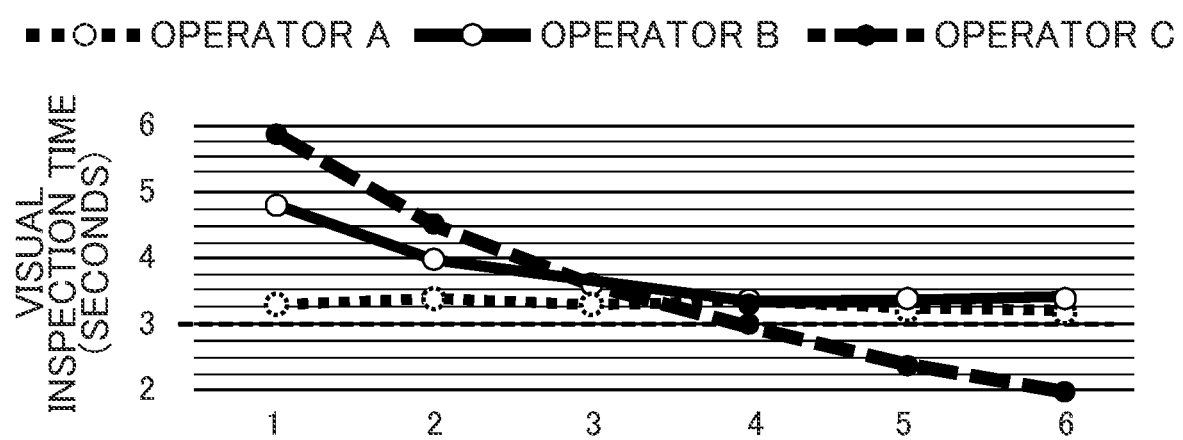
FIG. 29 illustrates a graph as analysis result information.

For example, FIG. 29 illustrates a graph as an example of the analysis result information 2815. FIG. 29 assumes that a procedure requires a visual inspection to be three seconds or longer, for example. Operator A is proficient and can always efficiently work almost within the specified time. Operators B and C are not proficient. However, operator B shows improvement in proficiency. Operator C makes no operation errors until the fourth day but makes operation errors on the fifth and sixth days. Operator C shows a sign of operation error on the fourth day.

The statistical analysis portion 2810 can perform various statistical analyses on inspection results represented by the inspection recording DB 2003. For example, the statistical analysis portion 2810 calculates an average or a dispersion value of differences between the standard inspection time and the actual inspection time (visual inspection time) for each product. The calculation results can be used to predict products that are likely to be defective. It is also possible to analyze the correlation between the defect and the inspection time based on the information on actual defective products and the information on the calculation result.

As described above, it is possible to provide optimum staffing based on the analysis for each operator ID and the above-described analysis on the degree of proficiency for each operator. As described above, it is possible to detect the sign of operation error from the statistical analysis result and use the sign to prevent the error.

Fourteenth Embodiment

The description below explains the fourteenth embodiment. Differences from the first embodiment will be mainly described. Common points with the first embodiment will be omitted or simplified.

Figure 30:
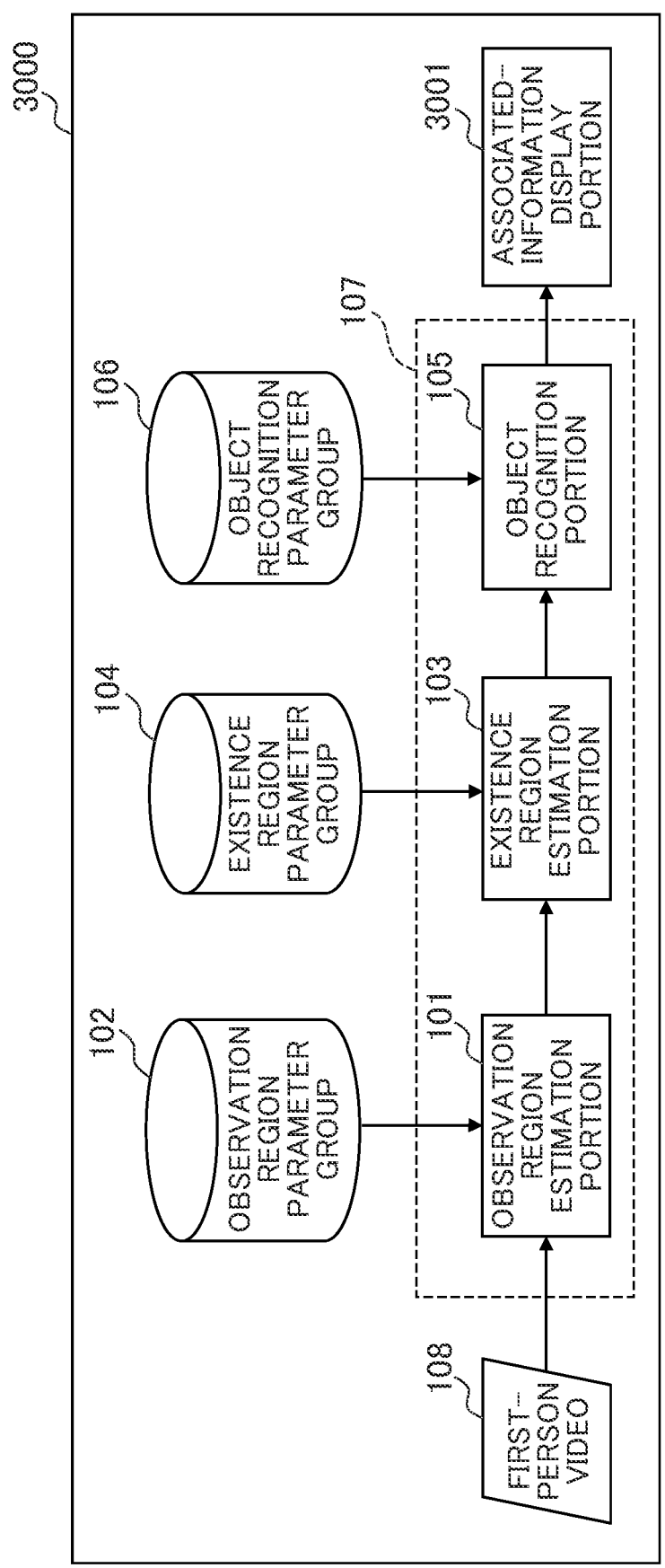
FIG. 30 illustrates a function configuration of the observed-object recognition system according to a fourteenth embodiment.

FIG. 30 illustrates a function configuration of the observed-object recognition system according to the fourteenth embodiment.

An observed-object recognition system 3000, according to the fourteenth embodiment, includes an associated-information display portion 3001.

The parameter groups 102, 104, and 106 are learned based on first operator result information that represents multiple objects recognized from the first-person video of the first operator via the observed-object recognition portion 107. The observed-object recognition portion 107 processes the first-person video 108 of the second operator based on the learned parameter groups 102, 104, and 106, and outputs processing result information representing the result of the process. The process result information contains association information that represents at least one of an estimated observation region, an estimated existence region, and a recognized object acquired during the process of the first-person video 108 of the second operator. The associated-information display portion 3001 associates the association information contained in the process result information with the first-person video 108 of the second operator based on the process result information and displays the associated association information to the second operator. This makes it possible to teach the second operator the operation of the first operator. The description below explains a specific example.

Suppose the first operator is a skilled operator and the second operator is a new operator. At an operation site, even the skilled operator often conducts operations while almost unconsciously paying attention to important points in various scenes. It is difficult to provide explicit knowledge. To teach this, the skilled operator needs to give guidance in constant attendance on the new operator and teach what kind of points should be noticed one by one. Skilled operators are significantly burdened.

To solve this, the present embodiment allows the skilled operator to perform operations as usual and learns the parameter groups 102, 104, and 106 from the data. The models (the observation region estimation portion 101, the existence region estimation portion 103, and the object recognition portion 105) provided with these parameter groups 102, 104, and 106 can be regarded as a result of modeling the operations of the skilled operator. This is comparable to modeling which object in what part of the video the skilled operator is watching in a given scene.

Allow a new operator to wear a device (such as smart glasses) that can capture and view the first-person video 108 during the operation. The system 3000 is used to processes the first-person video 108 in real time. The associated-information display portion 3001 allows the device to display at least one of the observation region, the existence region, and the object name to be superimposed onto the first-person video 108 of the new operator. The observation region, the existence region, or the object name is acquired based on at least one of the parameter groups 102, 104, and 106 learned based on the operation results of the skilled operator. This enables the new operator to intuitively understand what kind of parts and objects the skilled operator pays attention to in various scenes during the operation.

While there have been described the embodiments, these are examples to explain the present invention. The scope of the invention is not limited to the embodiments. The invention can also be embodied in various other forms. For example, it is possible to combine any two or more embodiments from the first to fourteenth embodiments.

What is claimed is:

1. An observed-object recognition system comprising:
   an observation region estimation portion to estimate an observation region that has a relatively high probability to be an observation point in at least one first-person image in a first-person video;
   an existence region estimation portion to estimate an existence region based on the observation region, the existence region being a region in which an observed object in the first-person image exists;
   an object recognition portion to recognize an object in the estimated existence region of the first-person image; and
   a recognition correction portion that identifies a minor first-person image belonging to chronological first-person images in the first-person video and containing a small amount of identical recognition result information based on recognition result information of the chronological first-person images and performs one of operations of deleting and correcting recognition result information of the minor first-person image based on a relative position of the minor first-person image in the first-person video with reference to a major first-person image belonging to the chronological first-person images in the first-person video and containing a large amount of identical recognition result information.

2. The observed-object recognition system according to claim 1, further comprising:
   a data augmentation portion to determine a partial image of the first-person image based on at least one of the observation region and the existence region and determine a plurality of images input to the object recognition portion for learning of the object recognition portion data augmentation of the determined partial image, wherein the data augmentation portion performs data augmentation on the partial image based on at least one of the observation region and the existence region.

3. The observed-object recognition system according to claim 1,
   wherein the observation region estimation portion corrects an observation region estimated for one of the first-person image and at least one subsequent first-person image based on recognition result information representing the object recognized by the object recognition portion; and
   wherein the existence region estimation portion estimates an existence region in one of the first-person image and at least one subsequent first-person image based on the corrected observation region.

4. The observed-object recognition system according to claim 1, further comprising:
   an identification-capable region estimation portion to estimate an identification-capable region in which a specific object in the first-person image has a relatively high probability to exist based on recognition result information representing the object recognized by the object recognition portion,
   wherein the observation region estimation portion corrects an observation region estimated for one of the first-person image and at least one subsequent first-person image based on the identification-capable region; and
   wherein the existence region estimation portion estimates an existence region in one of the first-person image and at least one subsequent first-person image based on the corrected observation region.

5. The observed-object recognition system according to claim 1, further comprising:
   a behavior estimation portion to estimate a behavior of an operator capturing the first-person image based on the first-person image and recognition result information representing the object recognized by the object recognition portion,
   wherein the observation region estimation portion corrects an observation region estimated for one of the first-person image and at least one subsequent first-person image based on the estimated behavior; and
   wherein the existence region estimation portion estimates an existence region in one of the first-person image and at least one subsequent first-person image based on the corrected observation region.

6. The observed-object recognition system according to claim 1,
   wherein the observation region estimation portion generates a possibility distribution representing a possibility of an observation point belonging to each of a plurality of positions in the first-person image and estimates a plurality of observation regions by applying clustering to the possibility distribution; and
   wherein the existence region estimation portion estimates an existence region for each of the plurality of observation regions and the object recognition portion recognizes an object.

7. The observed-object recognition system according to claim 1,
   wherein the object recognition portion recognizes an object of the first-person image in the estimated existence region based on a task model representing chronological regularity of an object viewed in a chronological first-person image in a first-person video recognition, and based on result information about at least one prior first-person image obtained prior to the first-person image.

8. The observed-object recognition system according to claim 1, further comprising:
an inspection recording portion to record inspection result information as inspection recording information representing an inspection record, wherein the inspection result information contains inspection object information representing a relevant inspection object belonging to operation information containing information about an inspection object to be visually inspected, and contains recognition result information representing the object recognized by the object recognition portion.

9. The observed-object recognition system according to claim 8,
wherein the inspection recording portion associates a video part with the inspection result information, and wherein the video part is included in the first-person video and is composed of at least one of first-person images belonging to a time during which the object is continuously recognized.

10. The observed-object recognition system according to claim 8,
wherein the operation information is acquired from an existing system that manages information about an operation process.

11. The observed-object recognition system according to claim 8, further comprising:
a statistical analysis portion capable of statistically analyzing the inspection recording information,
wherein the inspection result information contains information representing a visual inspection time during which the object in the first-person video was recognized, and information representing at least one of a product provided with the object and an operator viewing the object; and
wherein the statistical analysis portion statistically analyzes the inspection recording information in terms of a transition of the visual inspection time based on at least one of the product and the operator.

12. The observed-object recognition system according to claim 1, further comprising:
an alert portion that identifies a defined inspection time, the defined inspection time defined as a time necessary to inspect a relevant inspection object, from operation information containing information about an inspection object to be visually inspected, determines whether an actual inspection time conforms to the identified defined inspection time, the actual inspection time being calculated based on a number of consecutive first-person images in which the object is recognized, and outputs an alert when a determination result is false.

13. The observed-object recognition system according to claim 1, further comprising:
an associated-information display portion to display association information,
wherein the observation region estimation portion, the existence region estimation portion, and the object recognition portion process a first-person video of a second operator and output process result information representing a result of the processing based on a plurality of parameters learned based on first operator result information representing a plurality of objects recognized from a first-person video of a first operator via the observation region estimation portion, the existence region estimation portion, and the object recognition portion;
wherein the process result information contains association information representing at least one of an estimated observation region, an estimated existence region, and a recognized object resulting from processing on a first-person video of the second operator; and
wherein the associated-information display portion associates association information contained in the process result information with a first-person video of the second operator based on the process result information and displays the associated association information to the second operator.

14. An observed object recognition method comprising:
allowing a computer to estimate an observation region that has a relatively high probability to be an observation point in at least one first-person image in a first-person video;
allowing a computer to estimate an existence region that belongs to the first-person image and that is a region in which an observed object exists, based on the observation region;
allowing a computer to recognize an object in the estimated existence region of the first-person image; and
allowing a computer to identify a minor first-person image belonging to chronological first-person images in the first-person video and containing a small amount of identical recognition result information based on recognition result information of the chronological first-person images and performing one of operations of deleting and correcting recognition result information of the minor first-person image based on a relative position of the minor first-person image in the first-person video with reference to a major first-person image belonging to the chronological first-person images in the first-person video and containing a large amount of identical recognition result information.

* * * * *